United States Patent [19]

Woodley et al.

[11] Patent Number: 4,858,841
[45] Date of Patent: Aug. 22, 1989

[54] APPARATUS FOR LOADING TAPE INTO A CASSETTE

[75] Inventors: George M. Woodley, Shrewsbury; Richard A. McGrail, Worcester; Stephen J. Powers, Webster; William W. Ross, Framingham, all of Mass.

[73] Assignee: King Instrument Corporation, Westboro, Mass.

[21] Appl. No.: 116,665

[22] Filed: Nov. 2, 1987

[51] Int. Cl.$^4$ .......................... B31F 5/06; B65H 21/00
[52] U.S. Cl. .................................... 242/56 R; 156/506
[58] Field of Search ........................... 242/56 R, 58.1; 156/502–508

[56] References Cited

U.S. PATENT DOCUMENTS 4,632,327  12/1986  Kreeft et al. .................. 242/56 R
4,682,742  7/1987  Woodley et al. ............... 242/56 R Primary Examiner—Stuart S. Levy
Assistant Examiner—Steven M. Dubois
Attorney, Agent, or Firm—Schiller, Pandiscio & Kusmer

[57] ABSTRACT

The invention relates to an improved form of shift block assembly for a cassette tape loading machine. The shift block assembly is of the type that comprises first, second and third shift blocks mounted for sliding and rotating motion on a common axis. Each of the shift blocks has a guideway for aligning tape to be spliced and also is provided with means for applying suction to hold a tape in position in the guideway. The three blocks are disposed in tandem along the common axis, and the first and second shift blocks are used to hold the two leaders, while the third shift block is used to hold the tape to be loaded. Means are provided for shifting each block axially along and additional means are provided for rotating each block relative to the other on the axis.

47 Claims, 22 Drawing Sheets

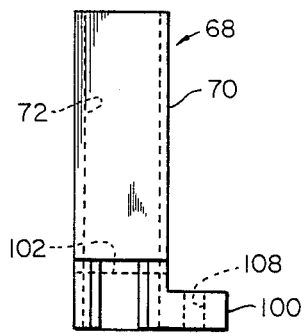
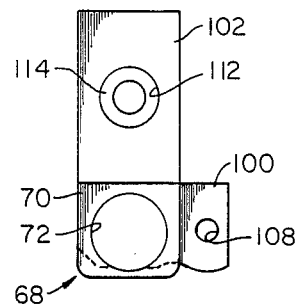
Fig. 7A    Fig. 7B
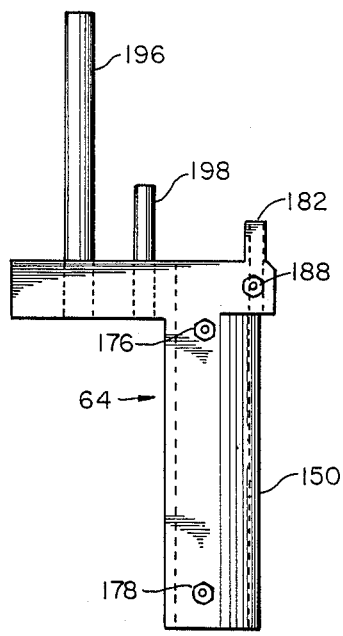
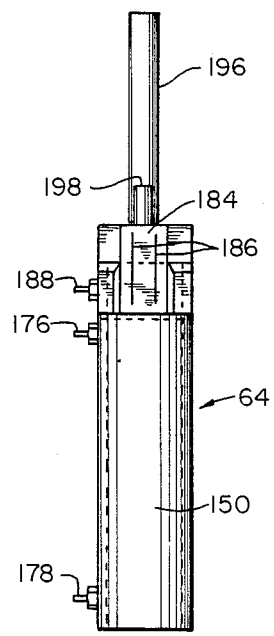
Fig. 8A    Fig. 8B
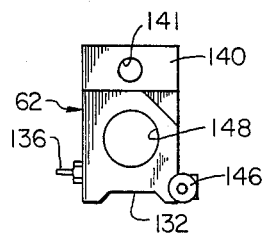
Fig. 9

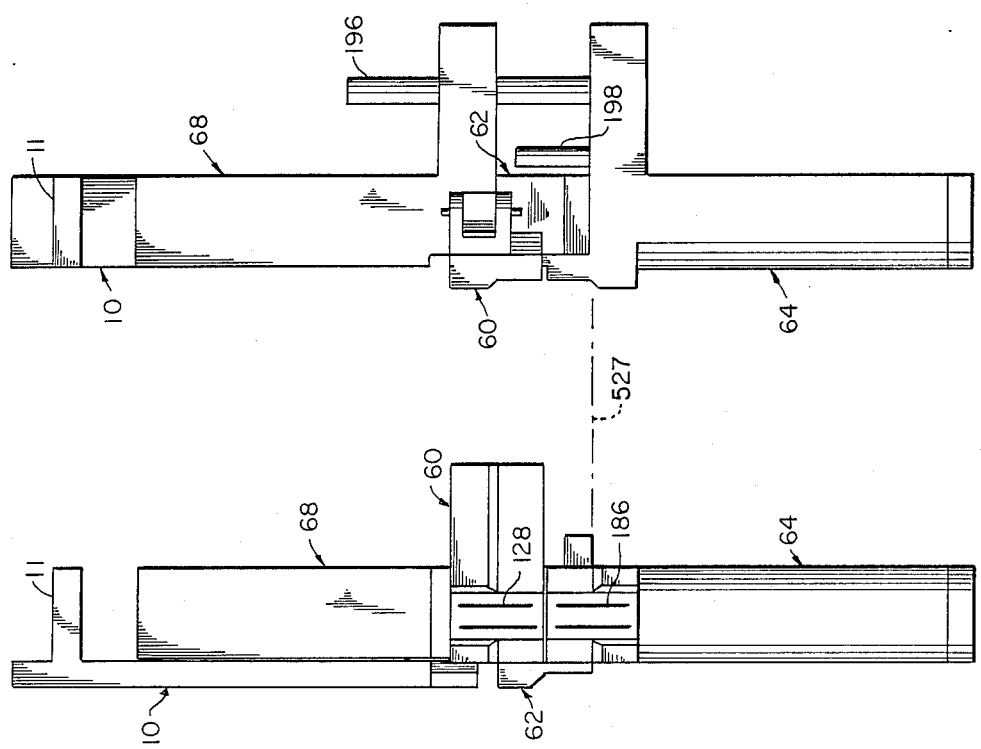

APPARATUS FOR LOADING TAPE INTO A CASSETTE

This invention relates to tape loading machines and more particularly to an improvement in machines for splicing and winding tape into cassettes.

BACKGROUND OF THE INVENTION

A variety of machines are known for loading magnetic tape onto hubs or into cassettes. Such machines are commonly called "tape loaders" or "cassette loaders". U.S. Pat. Nos. 3,637,153, 3,737,358, 3,997,123, 4,06,1286 and 4,062,719 illustrate machines for loading magnetic tape into various types of cassettes, including the Phillips-type cassettes used for audio recordings. U.S. Pat. Nos. 4,512,904 and 4,486,262 illustrate machines for loading magnetic tape into conventional video-type cassettes, e.g., VHS or Beta type cassettes. The audio cassettes and the video tape cassettes are similar in that the loaded cassettes consist of a cassette case containing two rotatable spools or hubs, a leader attached to each spool or hub, and a predetermined length of magnetic tape having its ends spliced to the two leaders. However, VHS and Beta type video cassettes are substantially larger than Phillips-type cassettes and differ therefrom in that they have (1) a pivoted door which conceals the tape when the cassette is not in use, (2) means for releasably locking the door, and (3) means for releasably locking the hubs against rotation.

The manufacture of loaded audio and video cassettes is similar in that the common practice is to start with a C-Zero ("C-0") cassette, i.e., a cassette that consists of the cassette case with the two hubs and a length of leader tape having one end connected to one hub and the other end connected to the second hub. These C-Zero cassettes are then filled with blank or prerecorded tape by means of automatic loading machines of the type known as in-cassette loaders. In some quarters the term "C-Zero" is reserved for audio cassettes and the corresponding empty video cassettes are called "V-Zero" ("V-0") cassettes. However, as used herein, the term "C-0" applies to both audio and video cassettes.

The loading procedure typically comprises the following steps: (1) withdrawing a selected length of leader tape from the C-0 cassette; (2) cutting the leader tape so as to form two first and second discrete leaders; (3) splicing the leading end of the magnetic tape to be wound into the cassette to said first leader, (4) rotating the hub to which said first leader is connected so as to wind a given length of magnetic tape onto that hub; (5) terminating winding of magnetic tape onto said first hub; (6) cutting the magnetic tape at a selected point outside of the cassette; (7) splicing the trailing end of the given length of magnetic tape to the second leader attached to the other hub; (8) winding the trailing end of the given length of magnetic tape and the second leader into the cassette; and (9) ejecting the loaded cassette and replacing it with a new C-Zero cassette. The procedure for loading magnetic tape into C-Zero video cassettes is the same as for audio tape, except that the loading machine must be capable of opening the door to the video cassette in order to permit extraction of the leader tape from the cassette, unlocking the hubs, and holding the door open during the time that the loading operation is being conducted.

Because the leader tape in a C-Zero video cassette is relatively short in comparison to the leader tape customarily provided in audio cassettes, the machines for loading video cassettes are more complicated by virtue of the necessity of working with a shorter leader.

Recently a new form of video cassette called the 8 millimeter ("8 mm.") video cassette has been developed. The 8 mm. cassette case is much smaller than the VHS or Beta-type video cassettes, and in fact its length and breadth are closer to the corresponding dimensions of a Phillips-type audio cassette case. However, the thickness of an 8 mm. video cassette is substantially greater than that of a Phillips-type cassette because of the fact that its video tape is substantially wider than conventional audio tape. A further significant difference is that the leader in a C-Zero 8 mm. video cassette is much shorter than the leader in the larger size VHS or Beta video cassettes. The leader of an 8 mm. cassette is only about 140 mm. long from hub to hub. Therefore when the leader is paid off from one or both of the two hubs (according to whether or not the leader was partially wound on one or both hubs), only a short portion of its length is available outside the cassette case for cutting, splicing and winding. This short length of available leader tape makes it impossible or unsatisfactory to load magnetic tape into 8 mm. cassettes using a tape loader patterned after those heretofore used to load audio cassettes or VHS or BETA format video cassettes, without violating the requirements of video cassette manufacturers regarding the quality, reliability and speed of loading 8 mm. cassettes.

More recently an 8 mm. video tape in-cassette loader featuring an improved splicing block assembly (also sometimes called a "shift block assembly") was developed. That improvement is disclosed in U.S. Pat. No. 4,682,742, issued July 28,1987, to George M. Woodley and William S. Bakes for "Apparatus and Method For Loading Tape Into a Cassette". The machine disclosed in that patent is capable of loading tape into a C-Zero 8 mm. cassette having standard length leaders, i.e., about 140 mm. long, in a manner that meets industry standards as to quality and speed. However, the novel shift block assembly disclosed in that patent occupies a relatively large space and hence limits the location and/or size of other machine components. More importantly, the shift block assembly requires a significant number of operating mechanisms, each of which (a) may be subject to breakdown with a consequent loss of productivity unless the machine is properly maintained and/or (b) tends to limit the speed at which the components of the shift block assembly can be moved as required by the desired operating cycle of the in-cassette loader.

BRIEF SUMMARY OF THE INVENTION

Accordingly the primary object of this invention is to improve upon the shift block assembly disclosed in U.S. Pat. No. 4,682,742 so as to provide a more reliable and compact shift block assembly for use in loading C-zero cassettes having a relatively short leader, e.g., 8 mm. video tape cassettes.

A further object of the invention is to provide an improved form of shift block assembly of the type that comprises three individual tape-supporting members, i.e., shift blocks, one each for holding one of the two leaders and the third for holding the tape which is to be wound into the cassette, disposed for separate movement along a common axis.

A further object of the invention is to provide a new and improved shift block assembly for automatic cassette loading machines which is characterized by a novel means for operating the members of the shift block assembly.

Still another object of the invention is to provide a novel shift block assembly which involves multiple modes of movement of component tape supporting members.

A further object is to provide a cassette loading machine that is characterized by a novel and improved shift block assembly, and in particular a machine for loading C-Zero cassettes having relatively short leader tapes.

These and other objects of the invention are achieved by providing a shift block assembly that essentially comprises first, second and third shift blocks that are mounted for sliding and rotating motion on a common axis. Each of the shift blocks has a guideway for aligning tape to be spliced and means for applying suction to hold a tape in position in the guideway. The three blocks are disposed in tandem along the common axis, with the first and second shift blocks being used to hold the two leaders, and the third shift block being used to hold the tape to be loaded. The first shift block is pivotally mounted on a support body, and that support body and the second shift block are provided with built-in means for shifting them lengthwise of the common axis. The third shift block is mounted so that it also can shift lengthwise along the axis. Separate means are provided for rotating each block on the common axis. The shift block assembly is used in association with a cutter mechanism that includes a knife having a knife edge disposed in a given cutting plane extending at a right angle to the aforementioned axis. The cutter mechanism is adapted for reciprocal operation so as to cause its knife blade to move back and forth in a given plane (a) between the first and second shift blocks when the latter are adjacent one another or (b) between the second and third shift blocks when the latter are adjacent one another, whereby the knife edge will sever a tape that extends between the first and second shift blocks or a tape that extends between the second and third shift blocks. The shift blocks are manipulated so as to allow the leader of a C-Zero cassette to be severed by the knife mechanism and spliced to a predetermined length of a tape that is loaded into the cassette.

Other features and many of the attendant advantages of the invention are set forth in or rendered obvious by the following detailed specification which is to be considered together with the accompanying drawings.

THE DRAWINGS

FIG. 7A is an enlarged side elevational view of the support member of the upper shift block assembly;

FIG. 7B is a plan view of the upper shift block support member;

FIG. 8A is an enlarged front elevation of the lower shift block;

FIG. 8B is an enlarged side elevation of the lower shift block;

FIG. 9 is a plan view of the middle shift block;

FIGS. 20A–D are fragmentary plan views illustrating different operating positions of a portion of the shift block assembly and a portion of the mechanism that controls rotation of components of the shift block assembly;

FIGS. 21A–G are fragmentary front elevational views of the shift block assembly sequentially illustrating its different operating positions during a cassette loading operation; and FIGS. 22A–G are fragmentary side elevational view of the shift block assembly corresponding to FIGS. 20A–G; and While machines for loading other types of audio or video cassettes may be made using the present invention, the preferred embodiment of the invention, as disclosed in the following detailed description and the drawings, is a machine for loading 8 mm. cassettes.

DESCRIPTION OF 8 MM. CASSETTE

Figure 1:
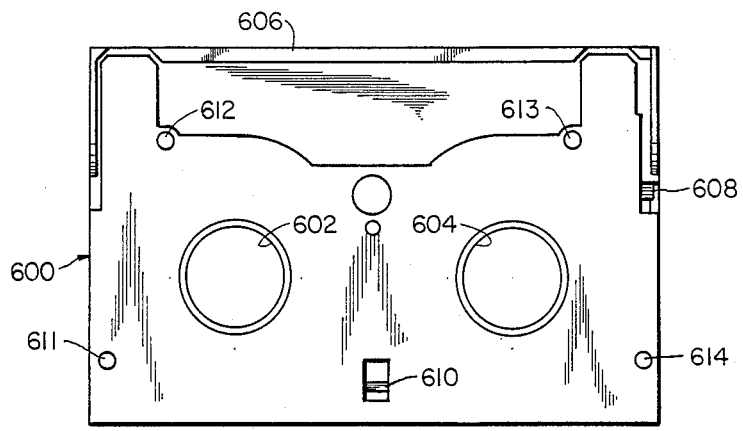
FIG. 1 is a rear view of an 8 mm. video cassette.

As seen in FIG. 1, a conventional 8 mm. cassette comprises a cassette case 600 containing a pair of rotatable hubs 602 and 604, a pivotally mounted door 606, a door locking mechanism (not shown) that is released by depressing a door release arm 608, a hub locking mechanism (not shown) that is released by depressing a hub unlocking tab 610, and four blind cavities 611, 612, 613, and 614 for receiving fixed cassette locater pins that locate the cassette in its corresponding video recorder.

GENERAL DESCRIPTION OF MACHINE EMBODYING THE INVENTION

Figure 2:
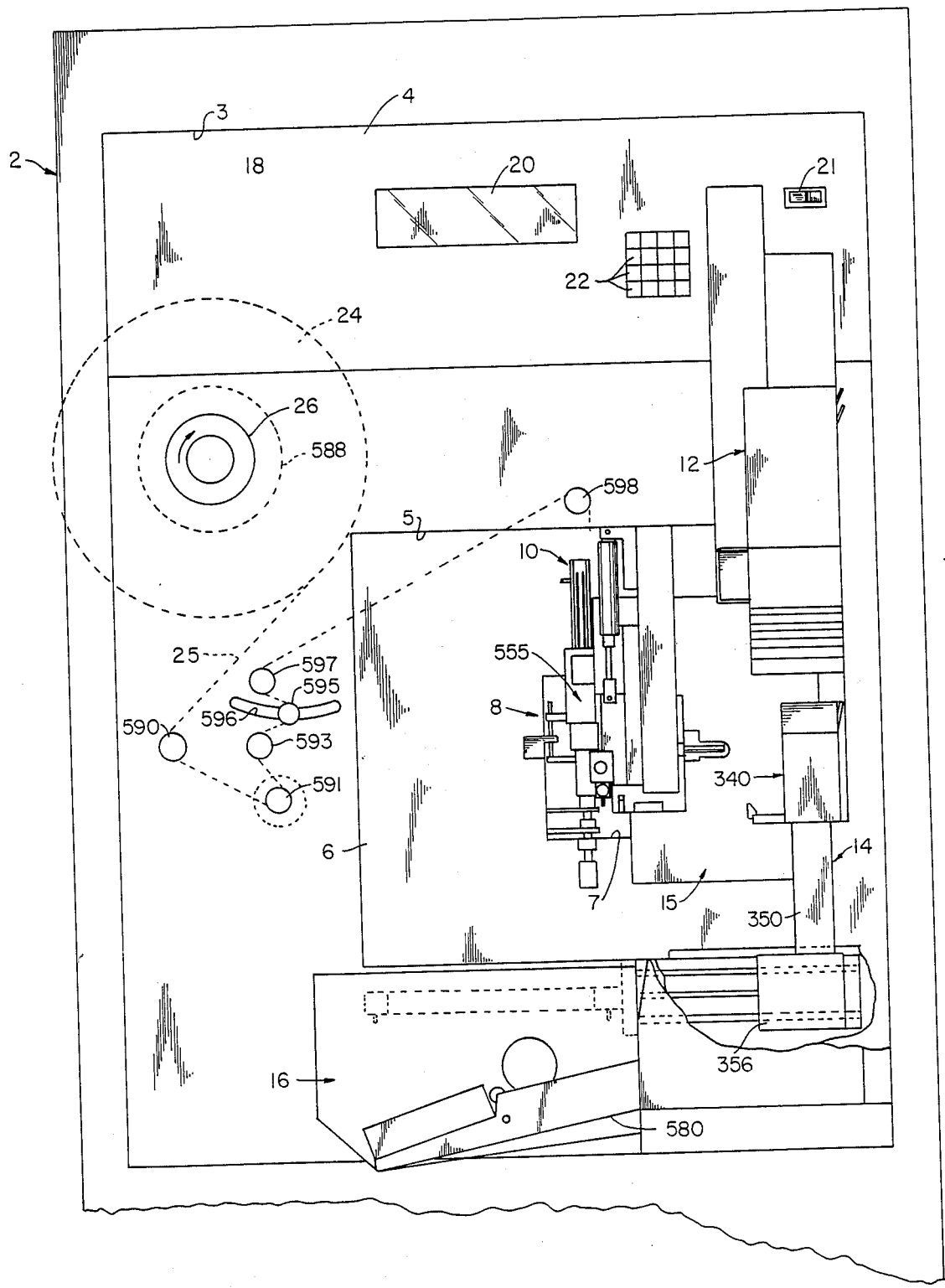
FIG. 2 is a front elevation of a cassette tape winding and splicing machine embodying an improved shift block assembly constructed in accordance with this invention.

Turning now to FIG. 2, there is illustrated an automatic cassette lading machine embodying the present invention. The illustrated machine comprises a cabinet or console 2 having a front wall with a cutout 3 in which is removably mounted a front panel 4. The latter in turn has a cutout 5 in which is releasably secured an insert panel 6 that carries a shift block assembly identified generally at 8 and a splicer assembly identified generally at 555. Also mounted on front panel 4 is a magazine assembly 12 for supporting a plurality of cassettes to be loaded, and a cassette collection assembly 16 which receives cassettes after they have been loaded. The machine also includes a cassette transport mechanism 14 which is adapted to receive cassettes discharged from magazine 12 and transport them to a loading station located proximate to shift block assembly 8, and a flat traverse carriage plate 15 that is movably mounted in front of a cutout 7 in insert plate 6 and carries cassette holding and positioning mechanisms hereinafter described. Traverse carriage plate 15 has an opening 430 (FIG. 3) hereinafter described. Also releasably mounted in cutout 3 above front panel 4 is an auxiliary panel 18 which supports portions of the control system (hereinafter described), including an electronic display unit 20, an on/off power switch 21, and a plurality of push-button type selection switches 22 that coact with the control system for selecting the amount of tape to be loaded into a cassette and performing selected test functions, e.g., testing operation of the splicer or shift block assembly. A reel 24 of use tape 25 to be loaded is supported on a supply reel shaft assembly 26.

As used herein, the term "use tape" signifies a recording medium in the form of a tape, e.g., a magnetic or photographic tape that is to be loaded into a V-Zero cassette. The use tape may be a blank tape or a prerecorded tape.

It is believed obvious that to the extent herein described, the machine illustrated in FIG. 1 is similar to prior cassette loading machines that are adapted to maintain a C-Zero cassette in a predetermined loading station while conducting the necessary operations of extracting the leader tape from that cassette and placing it on a pair of shift blocks, severing the leader tape into two leaders, splicing a first one of the leaders to the leading end of the use tape, winding the use tape and first leader into the cassette to be loaded, terminating winding, cutting the use tape to form a trailing end and a new leading end, splicing the trailing end of the use tape to the second leader, pulling the trailing end of the use tape and the second leader into the cassette, and then discharging the loaded cassette from the machine so that a new cycle of operation may be conducted wherein a second C-Zero cassette is loaded with use tape in the manner previously described.

SHIFT BLOCK ASSEMBLY MECHANISM

Figure 3:
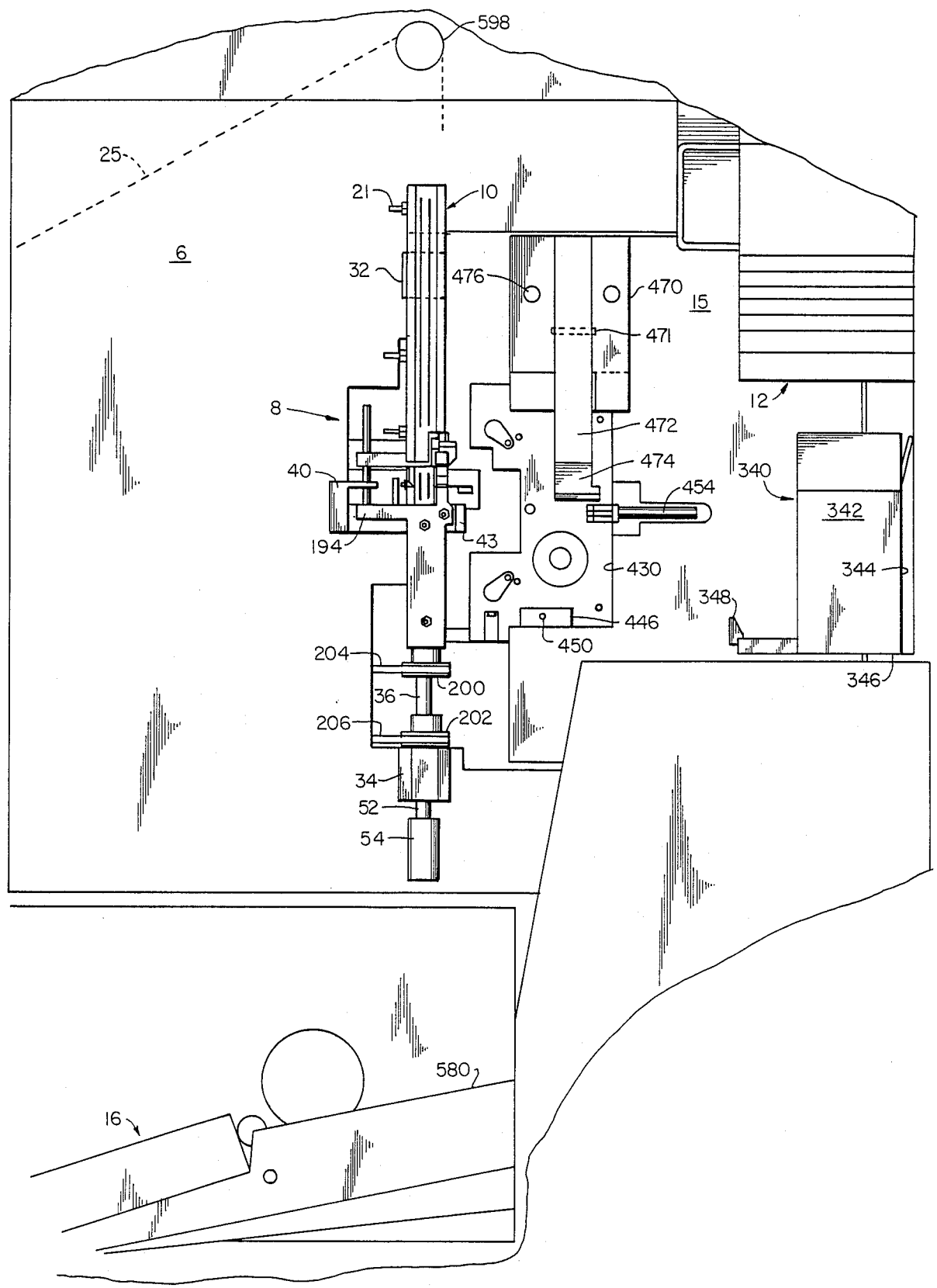
FIG. 3 is an enlargement of a portion of FIG. 2 but with the splicer removed.

Referring to FIG. 3, shift block assembly 8 is mounted to the insert panel 6 by means of a pair of bearing blocks 32 and 34 which are affixed to insert panel 6, and a shaft 36 that extends through the bearing blocks. Shaft 36 is mounted so as to be capable of axial and rotational movement in the two bearing blocks. The lower end of shaft 36 is slidably engaged by the free end of the piston or operating rod 52 of a single action pneumatic actuator 54 that is attached to insert panel 6. Actuator 54 has a fitting (not shown) adapted to be connected by a hose line (not shown) that is connected by suitable electrically controlled valve means (also not shown) to a source of pressurized air. The operating rod is spring biased to its retracted position and application of air to actuator 54 will cause its piston rod 52 to be extended. The engagement between shaft 36 and rod 52 is such that (a) shaft 36 is free to rotate on its axis relative to rod 52, and (b) when piston rod 52 is extended or retracted, shaft 36 will reciprocate up or down with it.

An L-shaped stop member 40 (FIGS. 3 and 20A-20D) having an arm 41 is affixed to panel 6 in position for arm 41 to intercept a pin 196 (hereinafter described but see FIGS. 4-6) and thereby limit rotation of a shift block support member 68 (hereinafter described) and a shift block member 64 (also hereinafter described but see FIGS. 4-6) in a first counterclockwise direction (as viewed in FIG. 5). A second stop member 43 is mounted on panel 6 in position to intercept an arm 194 (hereinafter described but see FIG. 3) on shift block 64, thereby limiting rotation of shift block 64 and shift block support member 68 in a second clockwise direction (as viewed in FIG. 20B). Cooperation of surfaces (all hereinafter described) on shift blocks 62 and 64 limit rotation of shaft 36 relative to lower splicing block 64.

Turning now to FIGS. 3-9, the shift block assembly 8 and an elongate use tape guide member 10 are carried by shaft 36. Shift block assembly 8 comprises a top or first shift block 60 (FIG. 4-6) that is movably mounted on shaft 36, a bottom or second shift block 64 that also is movably mounted on shaft 36, and a middle or third shift block 62. Shift block 60 forms part of a top shift block subassembly 58, the latter including a top shift block support member 68.

It should be noted that shift blocks 60, 62 and 64 are sometimes called "splicing blocks".

Figures 4, 5:
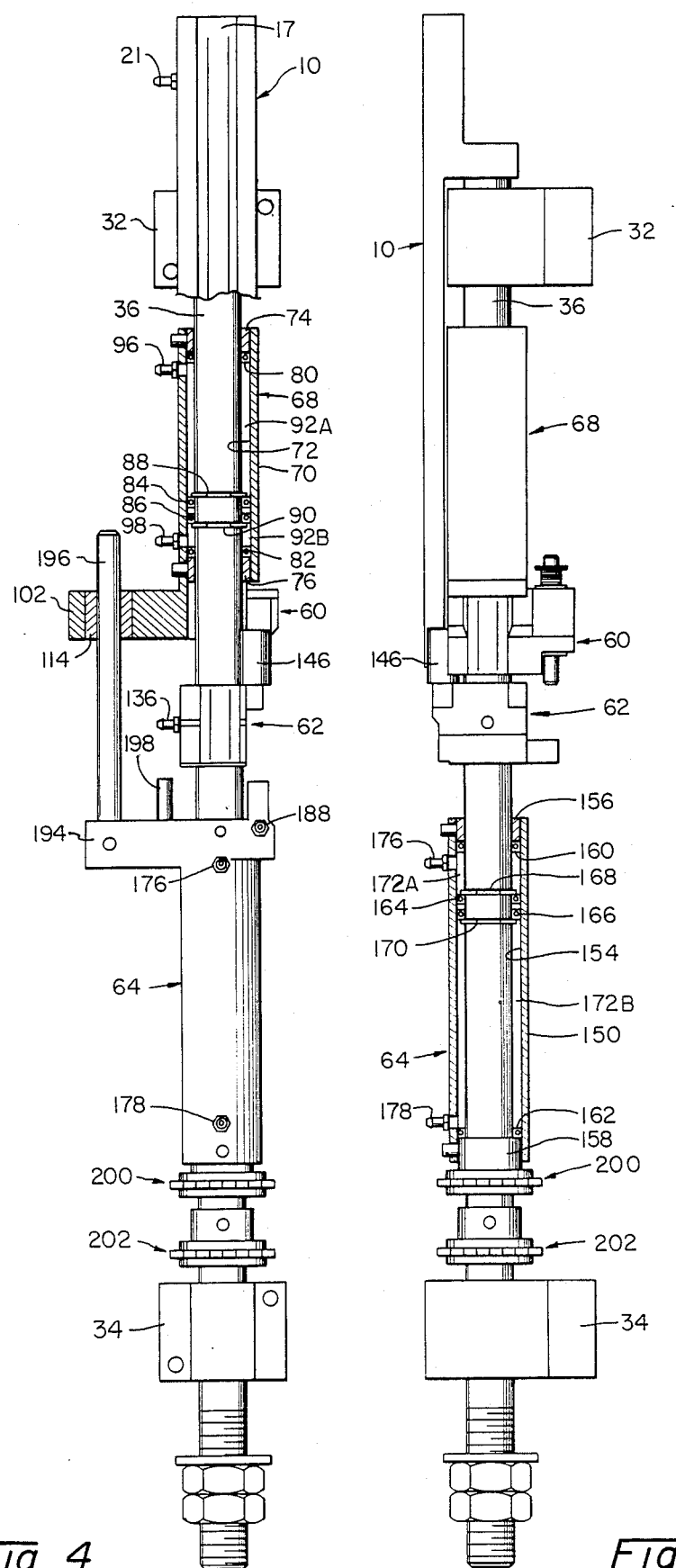
FIG. 4 is an enlarged sectional view in front elevation of the shift block assembly.
FIG. 5 is an enlarged sectional view in side elevation of the shift block assembly.
Figure 6:
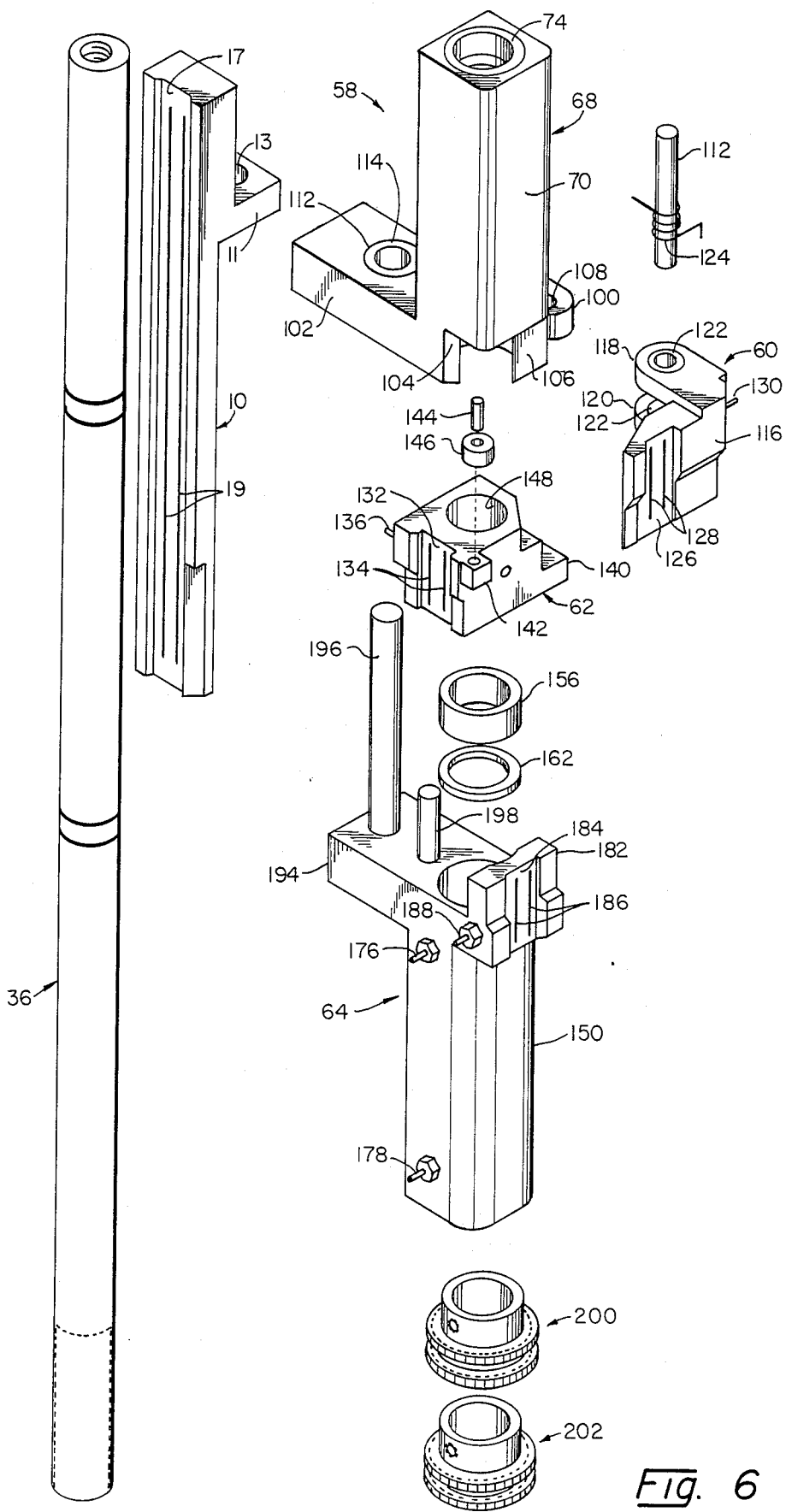
FIG. 6 is an exploded view of the three shift blocks and the shaft on which they are mounted.

Referring now to FIGS. 4-6, shift block support member 68 of top shift block subassembly 58 comprises an elongate body section 70 of generally rectangular exterior cross-section having a constant diameter axial through bore 72 (FIG. 4) that is arranged at its opposite ends to accept annular bushings 74 and 76 that are secured in place. Bushings 74 and 76 have inside diameters that are sized so as to make a snug sliding fit with shaft 36. Referring to FIG. 4, a pair of resilient annular seals 80 and 82 are disposed in bore 72 around shaft 36 adjacent to bushings 74 and 76. Mounted on shaft 36 are two identical resilient seal rings 84 and 86 that are disposed in mutual face to face relationship (FIG. 4) and are held in place against each other by two snap rings 88 and 90 that are received in grooves in the shaft. The outside diameter of seal rings 84 and 86 is set so that the seal rings make a close sliding fit with bore 72. Seal rings 84 and 86 and snap rings 88 and 90 cooperate with shift block support member 68 to subdivide bore 72 into two chambers 92A and 92B. End seals 80 and 82 provide a fluid seal around shaft 36 while permitting splicing block support member 68 to slide axially on the shaft. Additionally the snap rings 88 and 90 on shaft 36 coact with bushing seals 80 and 82 to limit movement of shift block support member 68, with movement in one direction being stopped by engagement of bushing seal 80 with snap ring 88 and movement in the opposite direction being stopped by engagement of bushing seal 82 with snap ring 90. Chambers 92A and 92B are provided with side ports 96 and 98 that are adapted to be connected by suitable hose lines (not shown) and suitable valve means (not shown) to a source of pressurized air so as to selectively permit pressurized air to be introduced to and removed from those chambers, whereby to cause splicing block support member 68 to move in one direction or the other along shaft 36.

Shift block support member 68 also has two right angle extensions or arms 100 and 102 at its bottom end (FIGS. 4-6, 7A, 7B). Body section 70 of shift block support member 68 is undercut as shown at 104 (FIG. 6) so as to form a flat surface 106 that is at a right angle to arm 102. Arm 100 is provided with flat upper and lower surfaces and a through bore 108 to receive a pivot pin 112 for shift block 60.

The second right angle extension or arm 102 has a hole 112 fitted with an annular bushing 114. Bushing 114 serves to accommodate a slide pin 196 hereinafter described.

As seen best in FIG. 6, upper shift block 60 comprises a body section 116 and a pair of parallel spaced arms 118 and 120 that extend over and under arm 100 and are provided with aligned holes fitted with bushings 122 sized to make a close rotating fit with pivot pin 112. A coil spring 124 surrounding pivot pin 112, and engaged at one end with body section 116 and at the other end with shift block support member 68, acts to bias shift block 60 on pivot pin 112 so as to keep its body section 116 engaged with the flat front surface 106 of support member 68 (see FIG. 20A), in which position flat recessed surface 126 hereinafter described of shift block 60 lies parallel to flat surface 106. Body section 116 of shift block 60 is formed with a flat recessed surface 126 (FIG. 6) that functions as a support and guide for the leader tape when use tape is to be loaded into the C-Zero cassette. The flat recessed surface 126 of shift block 60 is provided with a plurality of elongated narrow slits 128 (approximately 0.001–0.005 inch wide) which are connected to an interior chamber (not shown) having a port fitted with a hose fitting 130 adapted for connection to a hose line (not shown) leading to a source of vacuum via electrically controlled valve means.

The middle or third shift block 62 is of generally rectangular cross-section and is provided with a recessed flat surface 132 having two or more slits 134, similar to slits 128, that communicate with an interior chamber (not shown) in shift block 62. The interior chamber is provided with a port that is fitted with a hose fitting 136 adapted for connection to a hose line (not shown) leading to a vacuum source via suitable electrically controlled valve means (also not shown). Middle shift block 62 is provided with a flat extension 140 at its lower end that is provided with a hole 141 (FIG. 9) for receiving a pin 198 carried by splicing block 64. Block 62 also has a lateral extension 142 having a hole for receiving a pin 144 that rotatably supports a small roller 146. The purpose of roller 146 is described hereinafter. Middle shift block 62 is provided with a through bore 148 that is sized so as to make a close fit with shaft 36. Shift block 62 is affixed to shaft 36, e.g., by a set screw or roll pin (not shown), so that it and shaft 36 form a unitary sub-assembly.

The bottom or second shift block 64 (FIGS. 4–6, 8A and 8B) comprises an elongate body section 150 that has a generally rectangular cross-section and is formed with a constant diameter axial through bore 154 that is adapted at its opposite ends to accept bushings 156 and 158 (FIG. 5) that are affixed to shift block 64. Bushings 156 and 158 have inside diameters that are sized so as to make a snug sliding fit with shaft 36. Two resilient annular seals 160 and 162 are mounted in bore 154 adjacent bushings 156 and 158. Seals 160 and 162 serve to prevent leakage of air between shaft 36 and the two bushings. Also mounted on shaft 36 are two identical resilient seal rings 164 and 166 that are disposed in mutual face to face relationship and are held in place against each other by two snap rings 168 and 170 that are received in grooves in the shaft. The outside diameter of seal rings 164 and 166 is set so that the seal rings make a close sliding fit with bore 154. Seal rings 164 and 166 and their snap rings 168 and 170 cooperate with shift block 64 to subdivide bore 154 into two chambers 172A and 172B. Seals 160 and 162 provide an adequate fluid seal for the shaft while permitting splicing block 64 to slide axially on the shaft. Additionally snap rings 168 and 170 on shaft 36 coact with bushing seals 160 and 162 to limit movement of shift block 64, with movement in one direction being stopped by engagement of bushing seal 160 with snap ring 168 and movement in an opposite direction being stopped by engagement of bushing seal 162 with snap ring 170. Chambers 172A and 172B are provided with side ports having hose fittings 176 and 178 (FIGS. 4 and 5) that are adapted to be connected by suitable hose lines (not shown) and valve means (not shown) to a source of pressurized air (also not shown), so as to selectively permit pressurized air to be introduced to and removed from those chambers.

The upper end of lower shift block 64 has an extension 182 characterized by a recessed flat surface 184 that is interrupted by two or more elongated narrow slits 186 similar to slits 128 and 134. Slits 186 communicate with an interior chamber (not shown) formed in the main body of shift block 64. That interior chamber is provided with a port in which is secured a hose fitting 188 that is used for coupling the interior chamber to a suitable source of vacuum via a hose line (not shown) and suitable electrically controlled valve means (also not shown).

Lower shift block 64 also has a lateral right angle extension or arm 194 to which is affixed a relatively long slide pin or rod 196 and a relatively short slide pin or rod 198. Pin 196 is sized to make a sliding fit in bushing 114. Pin 196 is long enough to remain in bushing 114 even when the upper splicing block assembly and lower splicing block 64 are moved away from the center splicing block 62 in the manner illustrated in FIG. 21B. Pin 196 serves to connect the splicing block support member 68 to bottom shift block 64 so that those two members will rotate together but are capable of independent axial movement toward and away from the center splicing block.

The short slide pin 198 is sized to make a sliding fit in hole 141 of middle shift block 62. Pin 198 is long enough to reside in hole 141 when the splicing blocks are in the position shown in FIGS. 21C, 21D and 21E, but not long enough to engage any part of splicing block support member 68. Pin 198 cooperates with extension 140 to lock the bottom shift block 64 to the center shift block 62 during certain phases of the operating cycle of the machine; otherwise pin 198 is out of hole 141.

As seen in FIGS. 3–5, shift block support member 68 and shift blocks 62 and 64 are mounted in tandem on shaft 36, with shift block 62 being affixed to shaft 36 as previously noted, while support member 68 and shift block 64 are free to rotate and also slide relative to the shaft. Support member 68 is mounted on shaft 36 between shift block 62 and upper bearing block 32, while the lower shift block 64 is slidably and rotatably mounted on shaft 36 between shift block 62 and lower bearing block 34 (FIGS. 3–5).

The use tape guide member 10 has a lateral extension 11 that has a hole 13 sized to accommodate shaft 36. Guide member 10 is grooved so as to provide a flat recessed surface 17. A pair of slits 19 similar to slits 128 connect to an interior chamber (not shown) that has a port in which is mounted a hose fitting 21 (FIG. 3) for connecting the chamber via a hose line (not shown) and electrically-operable valve means (also not shown) to a vacuum source (not shown), whereby to apply suction to hold a tape against surface 17. Guide member 10 is secured to shaft 36 so that flat surface 17 is always aligned with surface 132 of block 62. However, guide member 10 will move up and down with shaft 36 as the latter is moved axially by actuator 54.

Referring now to FIGS. 3-5, there are two relatively small gear-type pulleys 200 and 202 mounted on shaft 36. The upper pulley 200 is locked to lower shift block 64 and is free to move axially and also to rotate relative to shaft 36, while the lower pulley 202 is affixed to shaft 36. Pulleys 200 and 202 carry mating perforated endless belts 204 and 206 respectively that extend to and around a pair of large pulleys 208 and 210 (FIGS. 14 and 15) respectively that are mounted on a shaft 214. Shaft 214 extends through a fixed cantilever support plate 216 (FIGS. 14 and 15) affixed to the rear side of front panel 6 and also through a second cantilever support plate 218 that is affixed to plate 216. Shaft 214 is journalled in a pair of bearings 220 and 222.

The lower rear pulley 210 is affixed to shaft 214 so that it will rotate with the shaft, while the upper large rear pulley 208 is rotatable relative to shaft 214. A lever arm 224 has one end attached to shaft 214. The other end of lever arm 224 is pivotally attached to a coupling member 226 that is affixed to the free end of the operating rod 228 of a double-acting pneumatic actuator 230. The opposite end of actuator 230 is pivotally secured at 232 to one end of an L-shaped arm 234. The other end of arm 234 is affixed at 238 to upper rear pulley 208.

Another pneumatic actuator 240 has one end of its cylinder pivotally secured at 242 to cantilever support 216, while the forward end of its operating rod 244 is connected by a coupling member 246 and a pivot rod 247 to gear 208.

Also connected to gear 208 is a rod 248. The forward end of rod 248 is pivotally connected by a connector member 250 to a shift plate 406 (see FIGS. 11-13). The rear end of rod 248 extends slidably through a hole in the two upstanding end sections 254 and 255 of a U-shaped coupling member 256 that is pivotally attached at 258 to gear 208. A snap ring 260 on rod 248 is engageable with end extension 254 and thus limits how far rod 248 may be pulled by shift plate 406 away from gear 208 without causing rotation of that gear.

An electromagnetic brake 262 (FIG. 15) is mounted on shaft 214 and is secured to cantilever support plate 216, so as to be able to lock shaft 214 against rotation when the brake is energized.

Figure 14:
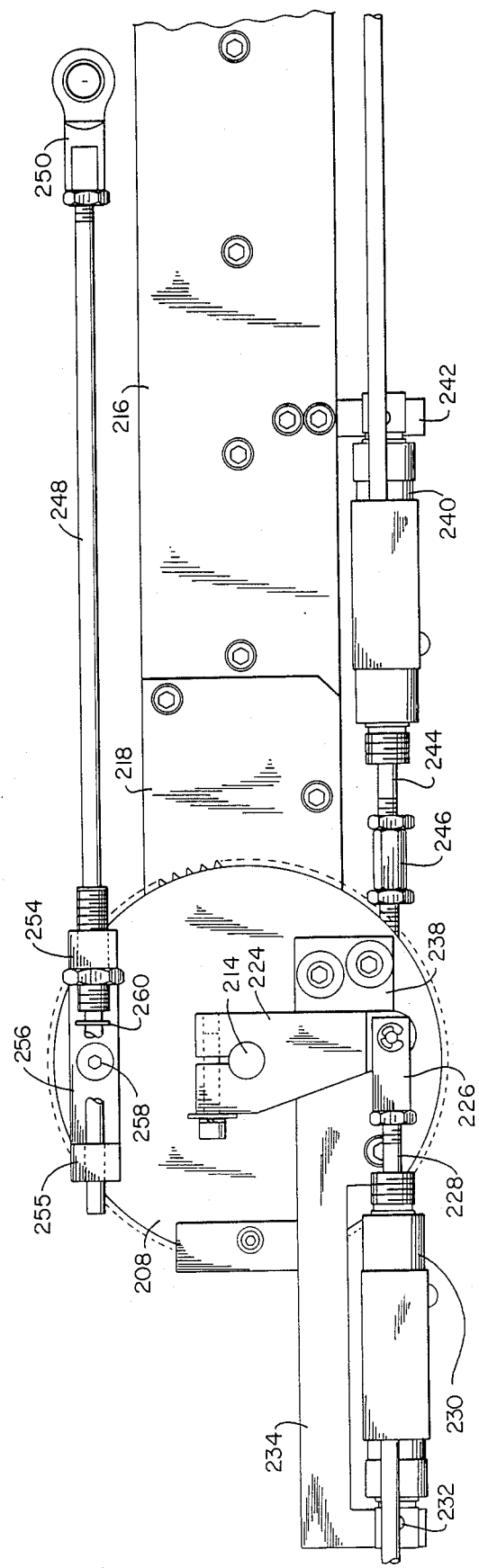
FIG. 14 is a plan view showing a mechanism behind the front panel for rotating selected shift blocks.
Figure 15:
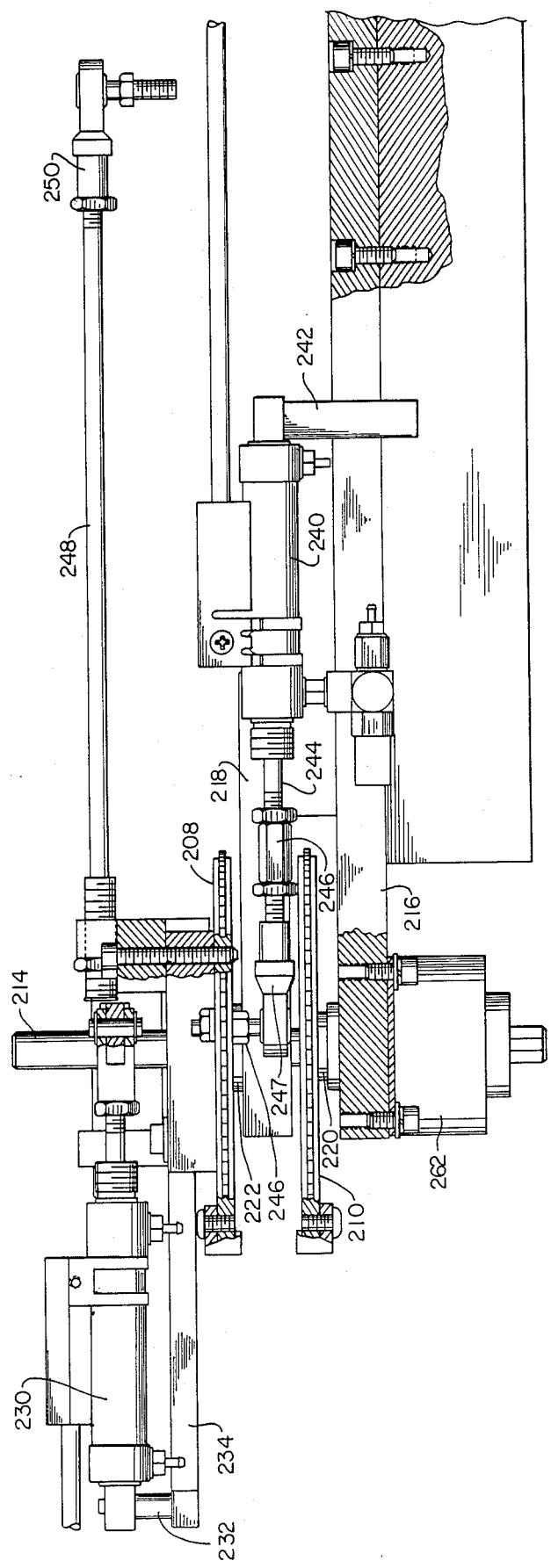
FIG. 15 is an enlarged sectional view in side elevation showing a mechanism behind the front panel for rotating selected shift blocks.
Figure 20A:
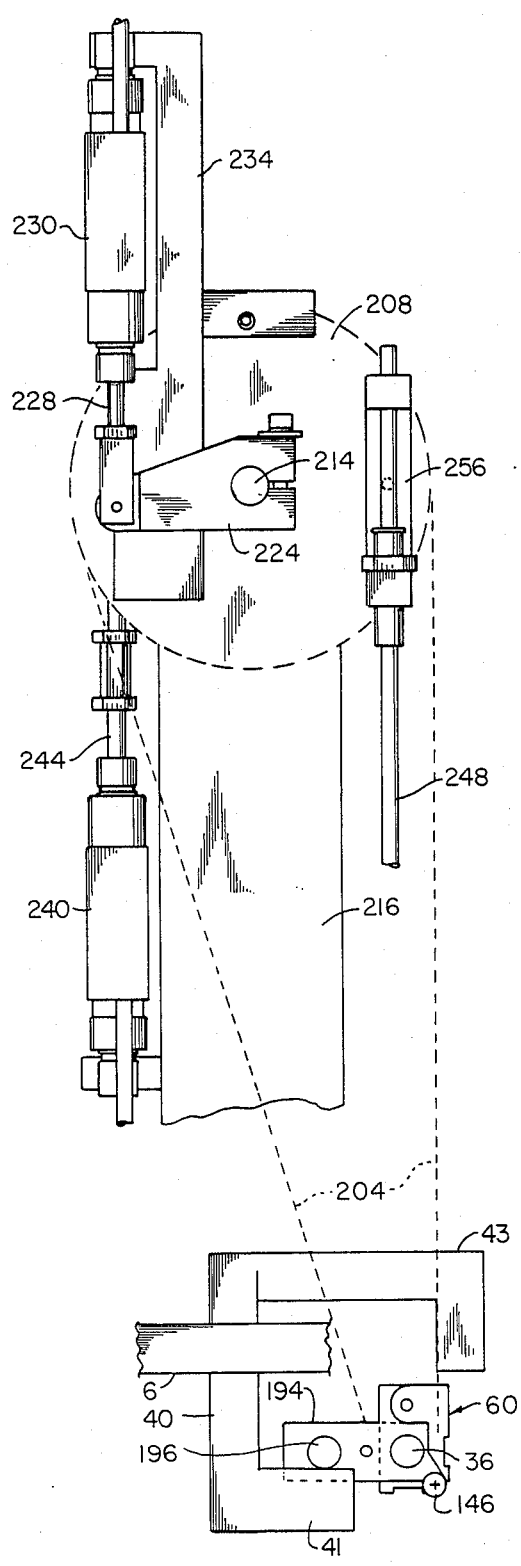
Figure 20B:
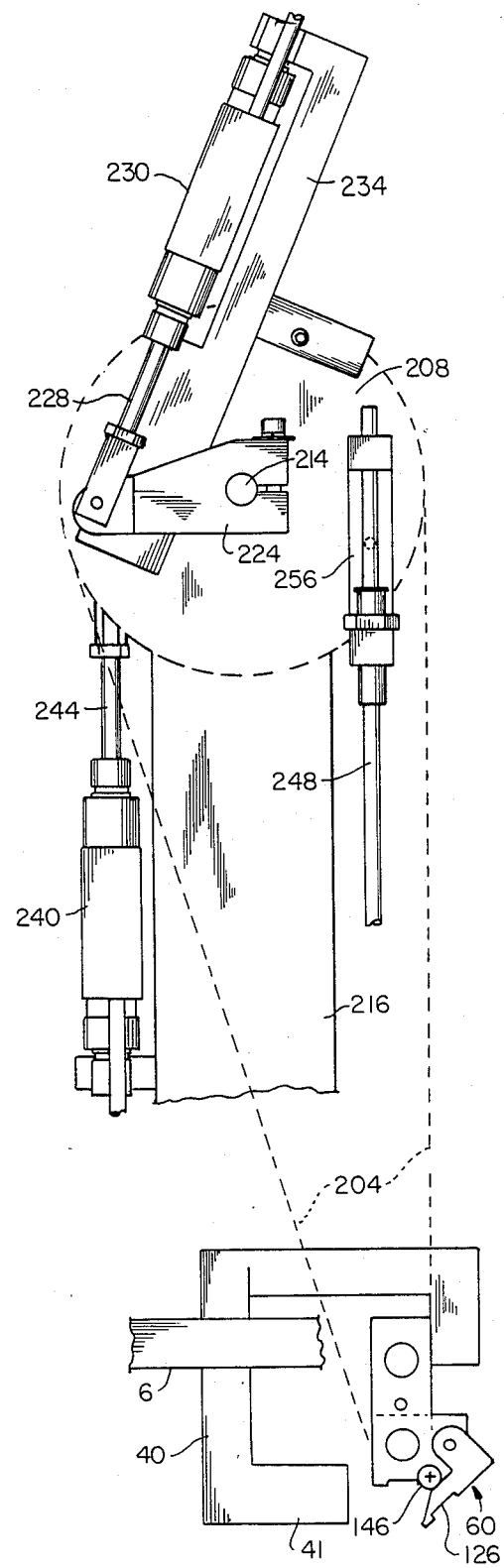

With the foregoing arrangement, when plate 406 moves forward a fixed distance, i.e., to its third or forward position as hereinafter described, it acts through rod 248 to urge the upper large pulley to rotate relative to pulley shaft 214 in a clockwise direction as seen in FIG. 20B (no air is applied to actuator 240 so that its piston rod is free to move at this time). If the actuator 230 is maintained with its piston rod 228 retracted as shown in FIG. 14, when the plate 406 moves forward, rotation of the upper large pulley 208 will cause corresponding rotation of the lower large pulley 210. Consequently, both the top splicing block assembly and the middle splicing block 62 will rotate with shaft 36. On the other hand if air is applied to actuator 230 so as to extend its piston rod 228 and simultaneously air is being applied to actuator 240 so as to lock its piston rod against movement, movement of piston rod 228 will cause shaft 36 and middle splicing block 62 to rotate relative to the upper splicing block assembly and the lower splicing block (see FIGS. 20B and 20C).

CASSETTE TRANSPORT MECHANISM

Figure 10:
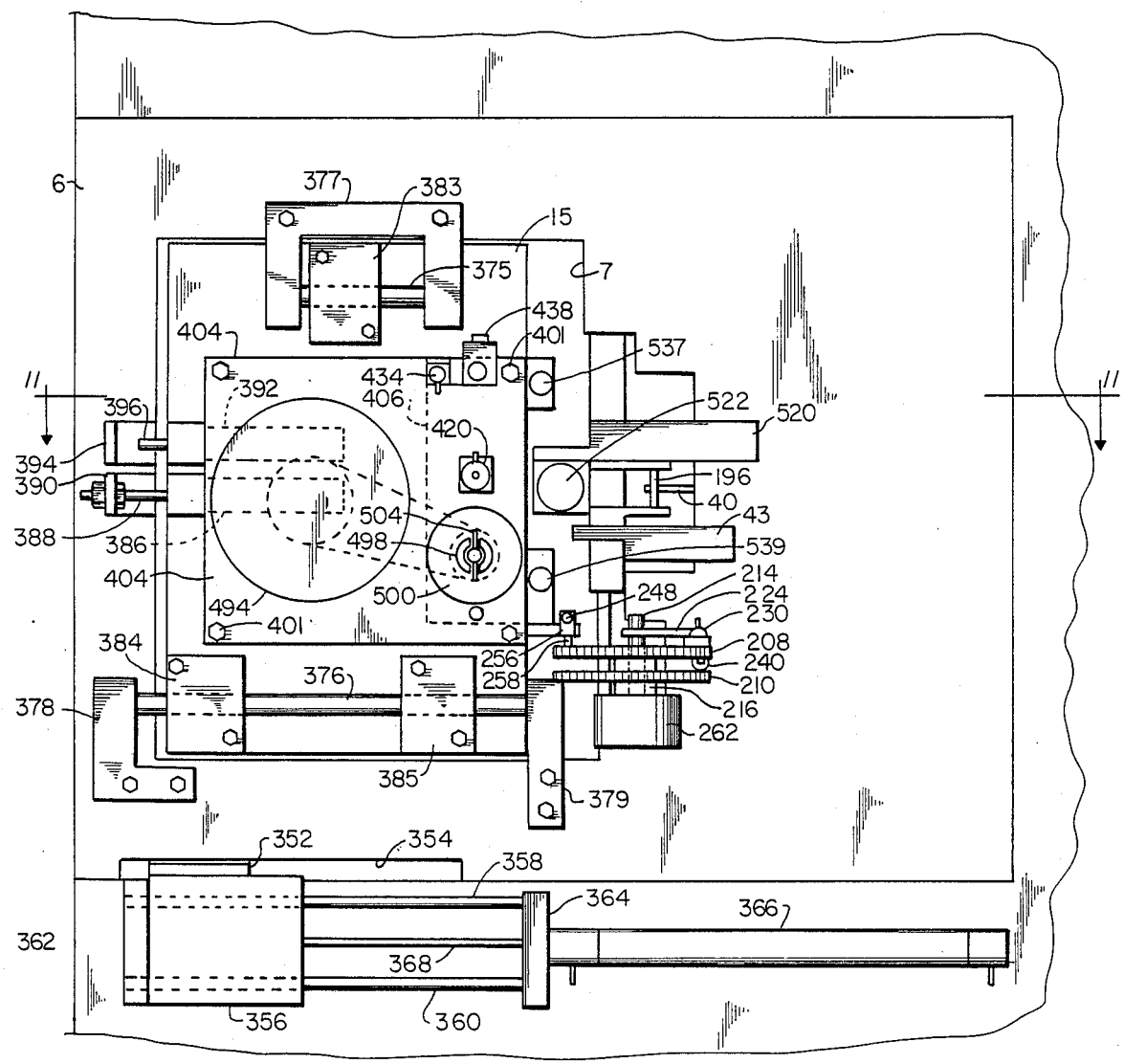
FIG. 10 is a fragmentary rear view in elevation of the same cassette loading machine.

Turning now to FIGS. 2, 3 and 10, the cassette transport mechanism 14 is designed to receive a C-Zero cassette discharged from magazine 12 and transport that cassette to a predetermined cassette-loading position adjacent the shift block assembly.

Although not shown, it is to be understood that magazine 12 includes a cassette feeder mechanism that is adapted to discharge C-Zero cassettes on command one at a time into holder 340 (hereinafter described) of cassette transport medium 14. Details of the cassette feeder mechanism are not provided since the feeder may take various forms known to persons skilled in the art and the form of cassette feeder is not critical or essential to the invention. Preferably, and by way of example, magazine 12 may have a cassette feeder mechanism made in accordance with the arrangement described and illustrated in U.S. Pat. No. 4,486,262, issued Dec. 4, 1984 to George M. Woodley for Cassette Loading Machine.

Cassette transport mechanism 14 comprises a cassette holder 340 that is open at its top and left hand ends (as viewed in FIG. 2) and comprises a front wall 342, an end wall 344, and a bottom wall 346. The upper ends of its front and end walls are shaped so as to form a flared top opening for receiving a cassette discharged from magazine 12. The bottom wall of the holder is provided with a spring-biased, pivotally mounted fence 348 at its outer end, i.e., the left hand end as viewed in FIG. 3. Fence 348 is capable of pivoting counterclockwise (as viewed in FIG. 3) to a generally horizontal position so as to allow the cassette to be removed from the holder for loading purposes.

The holder 340 is mounted on a support arm 350 (FIG. 2) that has a horizontal extension 352 (FIG. 10) that projects through a horizontal slot 354 in insert plate 6 and is attached to a slide block 356 slidably supported on a pair of slide rods 358 and 360 whose opposite ends are secured in a pair of support plates 362 and 364 affixed to the rear side of front panel 6. Also attached to support plate 364 is a pneumatic actuator 366. The piston rod 368 of actuator 366 extends through an oversized hole in support plate 364 and is secured to slide block 356. Piston rod 368 normally is extended so that slide block 356 is engaged with support plate 362, thereby locating holder 340 below magazine 12, as shown in FIG. 2. When piston rod 368 is retracted so as to cause slide block 356 to engage support plate 364, holder 340 will be located in position for the C-Zero cassette which it supports to be engaged by the takeup spindle of the cassette holding and positioning mechanisms hereinafter described.

MOVABLE CASSETTE HOLDING AND POSITIONING MECHANISMS

Turning now to FIGS. 2, 3, 10 and 11, the flat traverse carriage plate 15 is mounted in front of cutout 7 for reciprocal horizontal movement (as viewed in FIGS. 2 and 10) by an arrangement comprising a pair of slide rods 375 and 376. The opposite ends of rod 375 are anchored in an U-shaped support member 377 affixed to the rear side of insert plate 6, while the opposite ends of slide rod 375 are anchored in support members 378 and 379 affixed to the rear side of insert plate 6. Rods 375 and 376 make a close sliding fit in three slide bearing units 383, 384, and 385 (FIG. 10) attached to the rear side of transverse carriage plate 15, so as to allow the latter to move easily relative to insert plate 6. Reciprocating horizontal movement of traverse carriage plate 15 is accomplished by a pneumatic actuator 386 that is affixed to the rear side of that plate and has its piston rod 388 secured in an L-shaped bracket 390 affixed to the rear side of insert plate 6. When piston rod 388 is retracted, traverse plate 15 is disposed in a first or retracted limit position located a selected distance from the right hand edge of cutout 7 (as viewed in FIG. 3), and when piston rod 388 is extended, the traverse carriage plate is disposed in a second limit position located a predetermined distance closer to the left hand side of cutout 7 (as used in FIG. 3) and set so as to position a C-Zero cassette delivered by holder 340 with its leader engaging or located very close to the recessed tape supporting surfaces 126 and 192 of shift blocks 60 and 64.

The first limit position of traverse plate 15 is its "reset" position since that is the position it occupies when the machine is at the beginning of a cassette loading cycle. The second limit position of traverse plate 15 is its "cut" position since that is the position it occupies when the leader tape of a cassette is being cut.

The positioning of traverse plate 15 is also controlled by a second pneumatic actuator 392 affixed to the rear side of that plate directly above actuator 386, and a second L-shaped bracket 394 attached to insert plate 6 directly above bracket 390 The piston rod 396 of actuator 392 is free to move toward and away from bracket 394. Piston rod 396 is normally retracted (FIG. 10) and in that position, it is spaced from the rearward projecting portion of bracket 394 regardless of whether plate 15 is in its first or second limit position. Actuator 392 functions to prevent actuator 386 from shifting plate 15 to its first limit position (FIGS. 3 and 10). Actuator 392 is located so that extension of its piston rod 396 when actuator 386 is operated to shift plate 15 to the left (as seen in FIG. 10), will function (by engagement with bracket 394) to stop the traverse plate in a third position intermediate its first and second limit positions. This third intermediate position is its "wind" position since that is the position it occupies during winding of tape into a cassette. This third intermediate position also facilitates manipulation of the cassette leader as required for a cassette loading operation.

Figure 11:
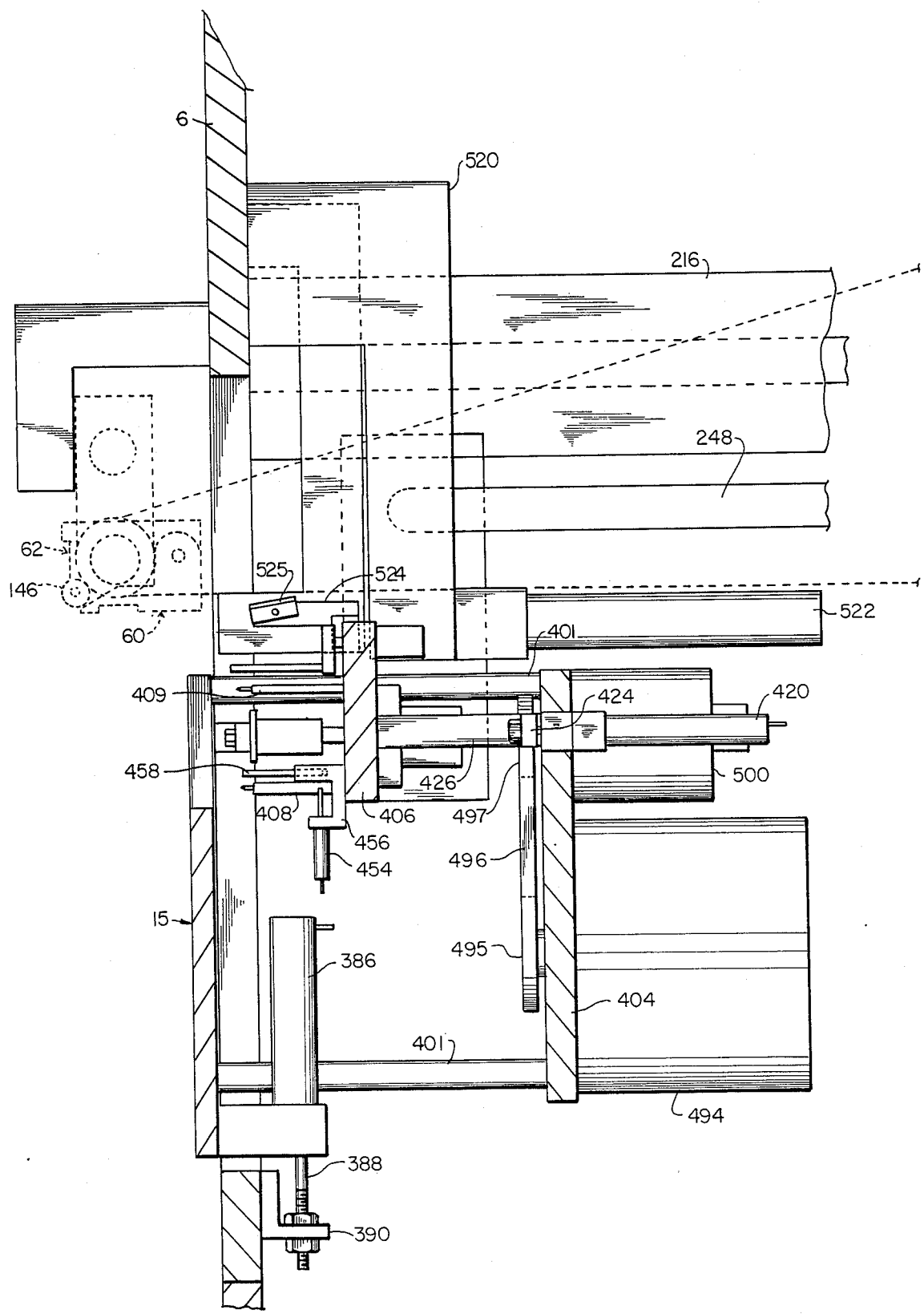
FIG. 11 is a plan sectional view taken along line 11—11 of FIG. 9, with certain members omitted for clarity.
Figure 12:
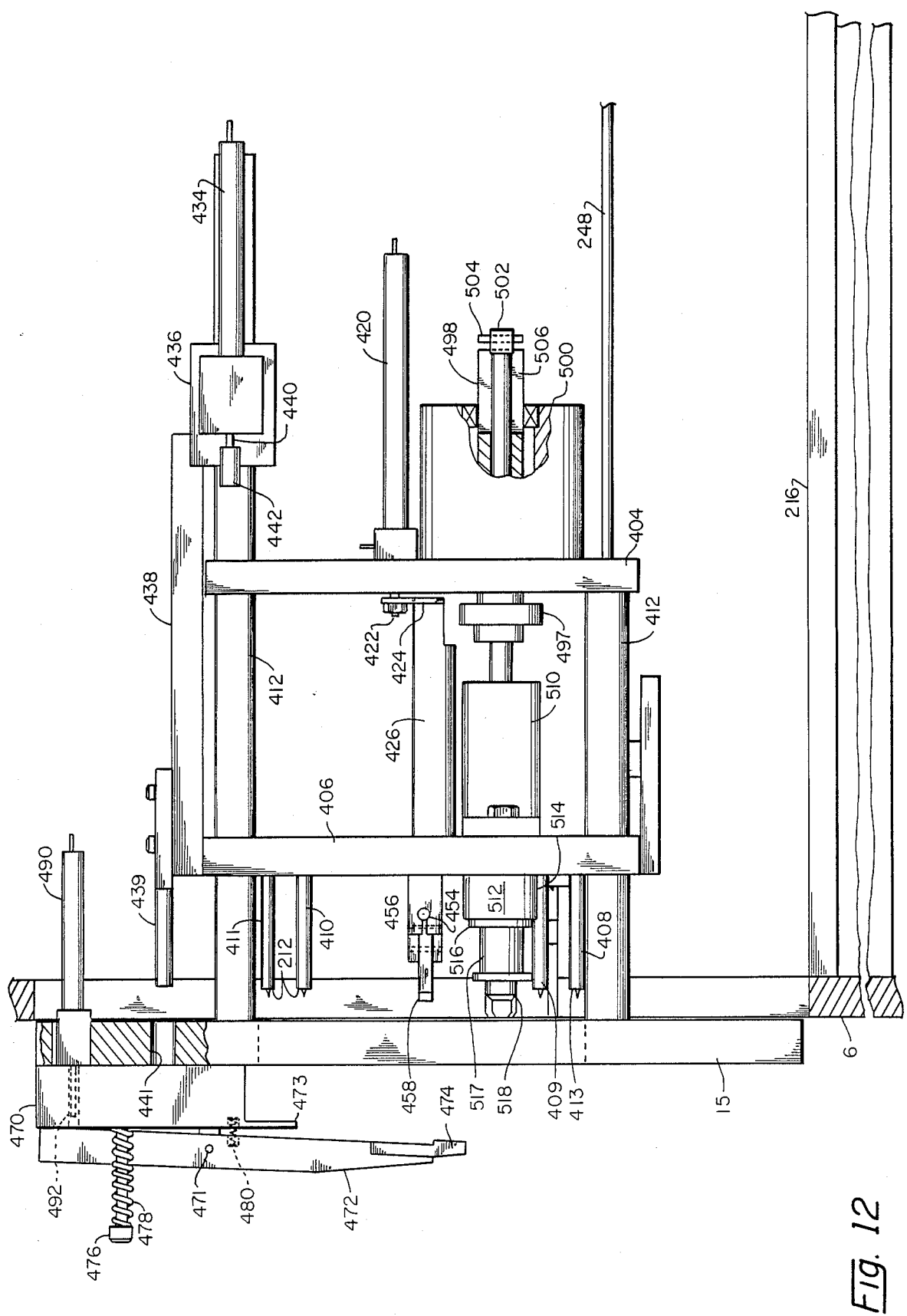
FIG. 12 is a vertical sectional view illustrating portions of the traverse plate and takeup spindle assembly.

Referring now to FIGS. 10-12, attached to traverse carriage plate 15 by means including four standoff rods 401 is a motor support plate 404. Mounted intermediate traverse carriage plate 15 and motor support plate 404 is a shift plate 406. The latter is slidably mounted on a pair of slide rods 412 (FIG. 12) that are affixed at one end to plate 15 and at the other end to motor support plate 404. Motor support plate 404 and shift plate 406 serve as supports for a takeup spindle assembly hereinafter described and also for other devices required to properly locate and condition a C-Zero cassette for a tape loading operation. More specifically, attached to and projecting forwardly from shift plate 406 are four cassette locator pins 408, 409, 410 and 411 (FIGS. 11-13) that are adapted to mate with the four locater holes 611-614 in the rear side of the cassette to be loaded. The forward ends of pins 408-411 are tapered and are reduced in diameter so as to forms shoulders 413 (FIGS. 12 and 13) that engage the rear surface of the 8 mm. C-Zero cassette to be loaded and thus limit penetration of the pins into the cassette locator holes.

Shift plate 406 is adapted to be located selectively in three different positions by means that include two pneumatic actuators 420 and 434 (FIGS. 10-12). Actuator 420 is attached to the rear side of motor support plate 404 and its piston rod 422 extends through an oversized hole in that plate and is attached to an arm 424 attached to a strut 426 that is affixed to the rear side of shift plate 406. When piston rod 422 is fully retracted (FIG. 12), shift plate 406 is disposed behind insert plate 6 in its first or rear limit position, wherein locator pins 408-411 are located behind traverse plate 15. This first or rear limit position is called the "reset" position since that is the position of the shift plate when the machine is at the beginning of a cassette loading cycle. When piston rod 422 is fully extended, shift plate 406 is in a second or forward limit position that is forward of the position shown in FIG. 12. In this second or forward limit position, locator pins 408-411 project through a large generally rectangular aperture 430 (FIG. 3) in traverse plate 15 and permit a cassette engaged by those pins to cause a cassette clamp mechanism hereinafter described to move forwardly away from traverse plate 15 while acting to hold the cassette against the shoulders 212 (FIGS. 12 and 13) of locator pins 408-411. This second (forward) limit position of shift plate 406 is called the "splice" position since it facilitates holding the leaders on the shift blocks while conducting a splicing operation.

The other actuator 434 (FIG. 10) is mounted to a support plate 436 attached to the rear end of an outrigger bar 438 that extends over and is spaced from motor support plate 404, and has its forward end attached to shift plate 406. The free end of piston rod 440 of actuator 434 is fitted with an enlarged head 442 for engagement with the rear side of motor support plate 404. When piston rod 440 is retracted, its head 442 is spaced from plate 404 sufficiently for it not to engage that plate when the piston rod 422 of actuator 420 is fully extended. However, when piston rod 440 is fully extended, its head 442 will engage motor support plate 404 and thereby cause shift plate 406 to be located in a third intermediate position in which a cassette mounted on locater pins 408-411 is held against shoulders 412 by the cassette clamp mechanism hereinafter described without the latter being shifted forwardly away from traverse plate 15. This intermediate position of shift plate 406 is called the "wind" or "load" position since winding is conducted when the shift plate is in that position.

Referring now to FIG. 3, a cassette door-unlocking mechanism is attached to carriage plate 15 at the bottom of its opening 430. The cassette door-unlocking mechanism may be a solenoid type device but preferably it comprises a pneumatic actuator 446. Normally, its piston rod 450 is retracted so that it is flush with or slightly behind the front surface of traverse plate 15. When piston rod 450 is fully extended, it will engage and depress the door unlocking member 608 of a C-Zero cassette supported by locator pins 408-411.

Referring again to FIGS. 3 and 11-13, a cassette hub-unlocking mechanism is carried by shift plate 406. The hub-unlocking mechanism may embody a solenoid-type actuator, but preferably it comprises a small pneumatic actuator 454 mounted to one end of a U-shaped support block 456 attached to the front side of shift plate 406. A hub-unlocking lever 458 is pivotally mounted by a pivot pin 460 at the other end of U-shaped support block 456. Actuator 454 is mounted so that its piston rod 462 extends toward the rear end of lever 458. Normally, piston rod 462 is retracted so as to be spaced from lever 458. When it is extended, it will engage the rear end of lever 458 and cause it to pivot counterclockwise (as viewed in FIG. 11). If piston rod 462 is extended while a cassette is supported on locator pins 408-411, the forward end of lever 458 will swing into engagement with the hub-unlocking member 610 of the cassette and move member 610 to its hub-unlocking position, thereby freeing the cassette hubs for rotation.

Also carried by shift plate 406 is a door opening bar 468 (FIG. 13) that extends forwardly at a right angle to traverse plate 15. Bar 468 is arranged so that it will engage the edge of the door 606 of a cassette mounted on locater pins 408-411 just after the door has been unlocked by operation of actuator 446, and will hold that door open so long as shift plate 406 is in its forward limit position or its intermediate position as determined by shift plate actuators 420 and 434.

Referring now to FIGS. 3 and 12, attached to the front side of traverse plate 15 is a pivot mount 470, to which is pivotally mounted at 471 a clamp lever 472 having a cassette holding portion 474 at its bottom end. Clamp lever 472 is provided for the purpose of clamping a C-Zero cassette to traverse plate 15. Pivot mount 470 has a depending lip or flange 473 spaced from traverse plate 15 that acts as a top guide for the cassette to be loaded. Pivot mount 470 is slidably mounted on two parallel support rods 476 attached to traverse plate 15 and is biased toward plate 15 by compression springs 478 (FIG. 12) on rods 476. Rods 476 have a length such as to permit mount 470 to move away from traverse plate 15 a distance equal to that between the second limit position and the intermediate position of shift plate 406. A compression spring 480 (FIG. 12) between pivot mount 470 and the lower end of clamp lever 472 urges the clamp lever to pivot so as to urge its cassette holding portion 474 away from traverse plate 15. A pneumatic clamp-releasing actuator 490 is attached to the rear side of pivot mount 470. The piston rod 492 of actuator 490 extends through an oversized hole in traverse plate 15 located directly behind the clamp lever. When piston rod 492 is retracted, the position of clamp lever 472 is determined by spring 480. When the piston rod of actuator 490 is extended, clamp lever 472 is forced to pivot so as to shift its cassette holding portion 474 toward traverse plate 15. Pivot mount 470 is adapted to limit pivotal movement of the clamp lever on its pivot 471.

Referring to FIG. 12, a pivot mount displacement bar 439 is affixed to outrigger bar 438 in alignment with a hole 441 in traverse plate 15. Bar 139 has a length such that it will pass through hole 441 and engage and push pivot mount 470 away from traverse plate 15 only when the shift plate 406 is shifted to its forward "splice" position.

TAKEUP SPINDLE DRIVE ASSEMBLY

Motor support plate 404 and shift plate 406 act as supports for a takeup spindle drive assembly which is illustrated in detail in FIGS. 3, 10 and 11-13. A takeup motor 494 is affixed to the rear side of plate 404. The output shaft of motor 494 extends through an oversized hole in plate 404 and has a pulley 495 attached to its outer end. A belt 496 extends around pulley 495 and a second pulley 497 attached to a hollow shaft 498. The latter is rotatably mounted in a bearing assembly 500 (FIGS. 11 and 12) that is attached to motor support plate 404. Slidably mounted in hollow shaft 498 is a shaft 502 having at its rear end a diametrically mounted pin 504 whose opposite ends project into a diametrical slot 506 in hollow shaft 498. Pin 504 and slot 506 coact to cause shaft 502 to rotate with hollow shaft 498, while permitting the former to slide axially within the latter.

Shaft 502 is rotatably and slidably mounted in a bearing unit 510 attached to shift plate 406 and its forward end is coupled to a first section 512 of an electromagnetic clutch unit 514 affixed to shift plate 406. A second section 516 of the same clutch supports a takeup spindle 517 that is provided with a hub adaptor 518 configured to make a driving engagement with the lower hub of a cassette disposed in tape loading position. Clutch 514 is normally deenergized, whereby its output section 516 is free to rotate relative to its input section 512. When the clutch is energized, its output section is clutched to its input section, so that takeup spindle 517 will rotate with shaft 502.

TAPE CUTTER MECHANISM

Figure 22B:
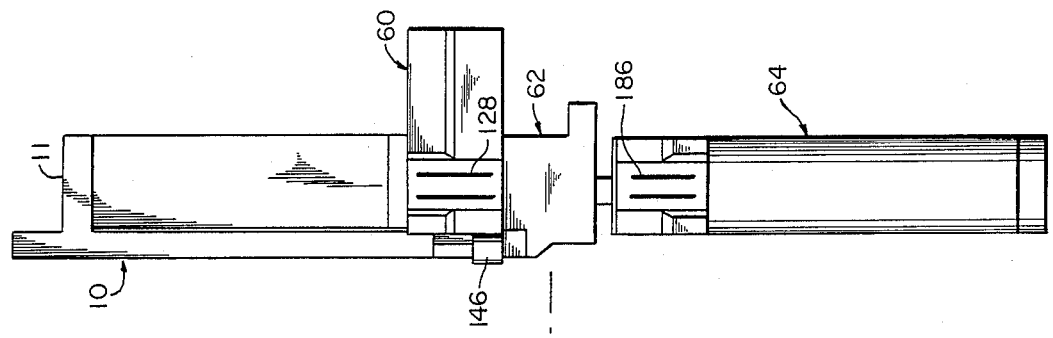
Figure 22A:
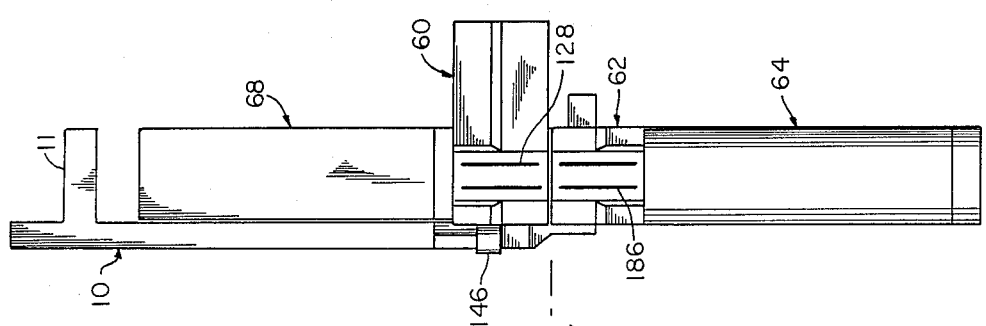
Figure 21A:
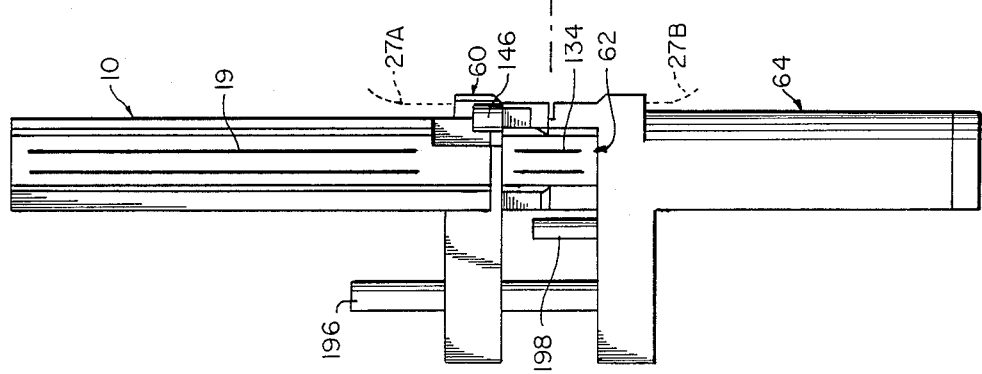
Figure 22D:
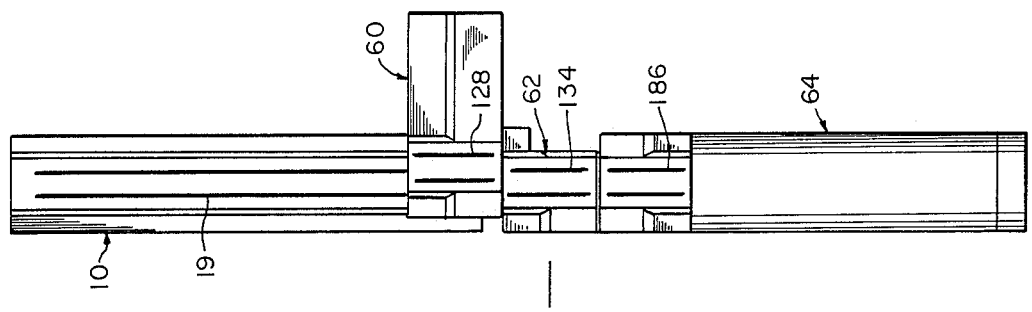
Figure 21D:
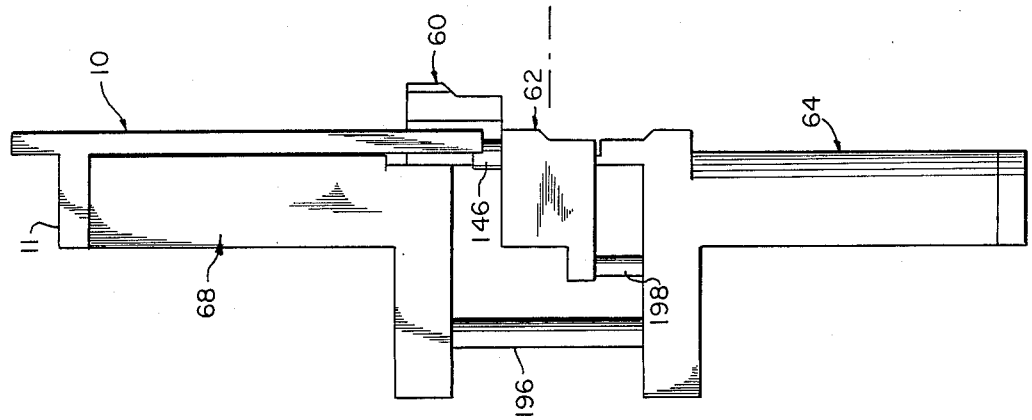
Figure 22C:
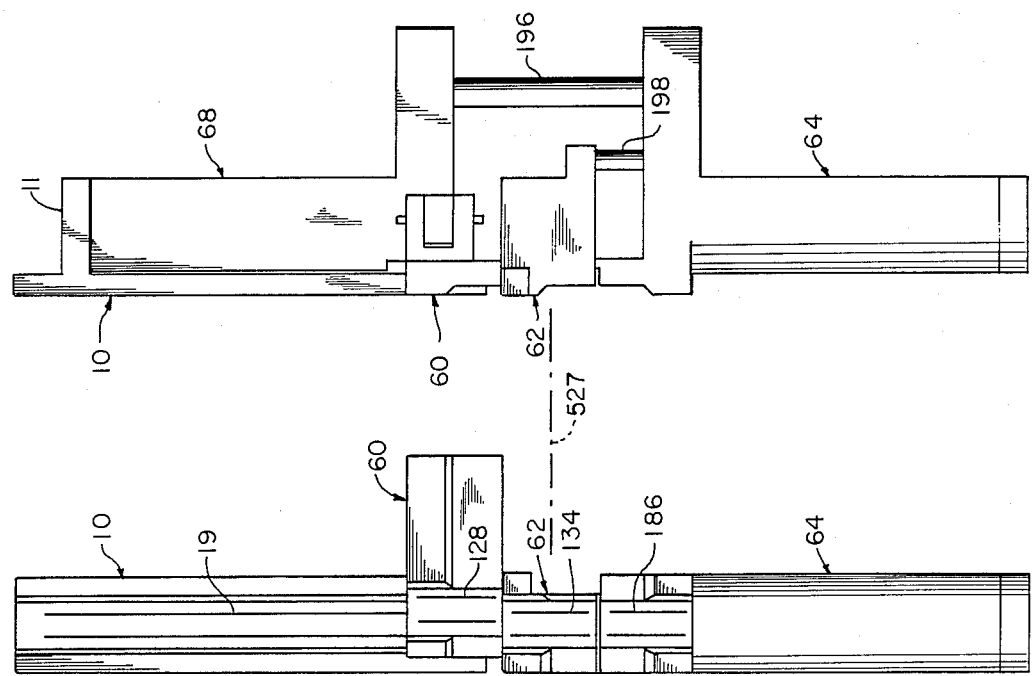
Figure 21C:
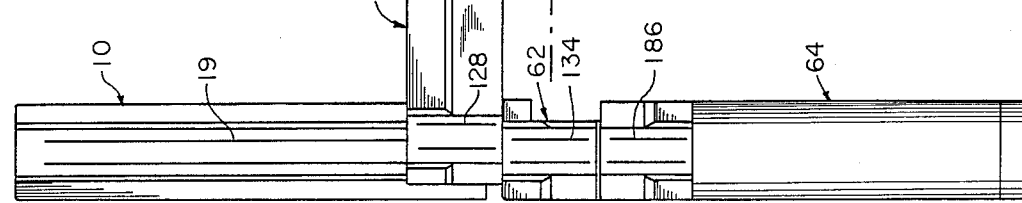
Figure 22F:
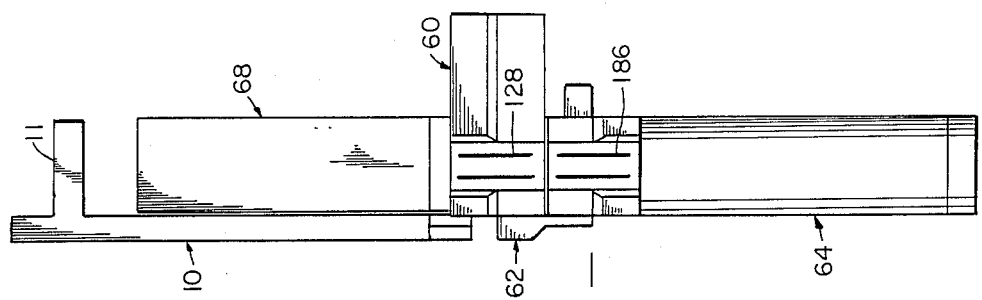
Figure 21F:
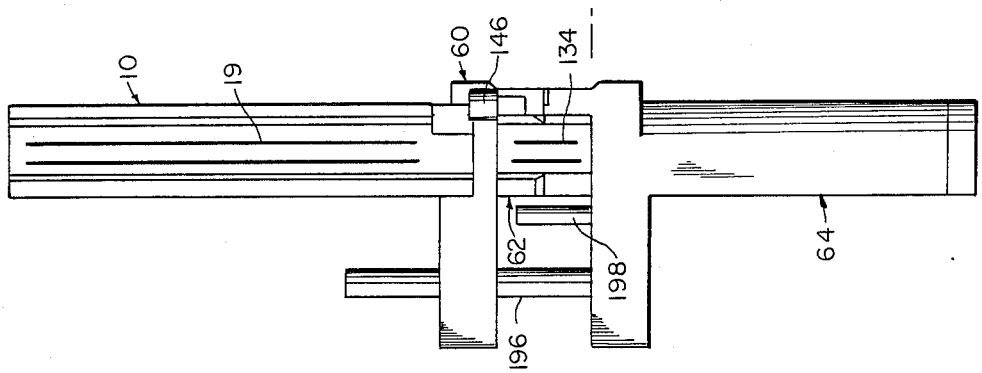
Figure 22E:
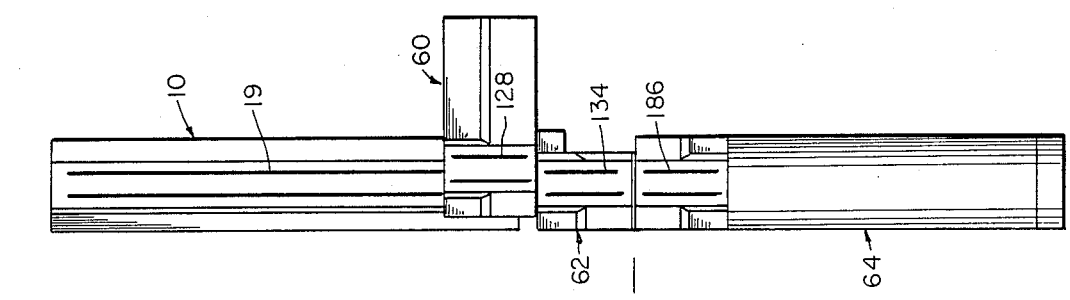
Figure 21E:
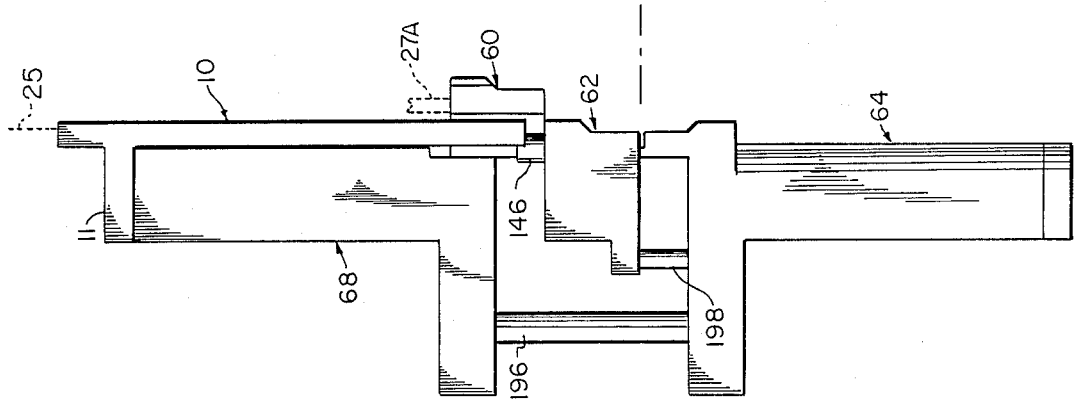

Referring now to FIGS. 10 and 11, an L-shaped arm 520 is attached to the rear side of insert plate 6. Affixed to arm 520 is a pneumatic actuator 522 having a cutter assembly 524 attached to the outer end of its piston rod 526. Cutting assembly 524 has a cutter blade 525 that extends in a horizontal plane (as viewed in FIGS. 2 and 3). Actuator 522 is positioned so that (a) when piston rod 526 is fully retracted (FIG. 11), cutter assembly 524 is located in or behind insert plate 6, and (b) when piston rod 520 is extended, cutter 525 will move through traverse plate 15 along a predetermined cut line 527 (FIGS. 21A, 22A). When piston rod 520 is extended, the cutter blade will either (1) enter a narrow gap that is formed between shift blocks 60 and 64 if the latter are positioned as shown in FIGS. 21A and 22A, whereby to cut a leader tape extending between those shift blocks, or (2) enter a narrow gap that is formed between shift blocks 62 and 64 if the latter blocks are positioned as shown in FIGS. 21E and 22E, whereby to cut a use tape extending between those shift blocks.

SPLICER MECHANISM

Referring now to FIGS. 2 and 16-18, attached to the front side of the machine console is a splicer mount assembly comprising a support plate 550 pivotally mounted at 551 to a pivot mount 552 affixed to insert panel 6. A mount plate 553 is affixed to support plate 550 and a slide block 554 is slidably mounted to mount plate 553 by a tongue and groove arrangement so as to be capable of reciprocal movement on a vertical axis, i.e., an axis extending vertically parallel to insert plate 6 (as viewed in FIG. 2). A splicer 555 of conventional design is affixed to slide block 554 so as to move therewith. A pneumatic actuator 556 is affixed to support plate 550 and has its piston rod 558 pivotally attached to slide block 554. Reciprocal movement of piston rod 558 will cause slide block 554 to move between first and second predetermined vertically-spaced splicing positions. Details of splicer 555 are not illustrated or described since the splicer may take various forms. Preferably, it is a splicer of the kind having a reciprocal tape-applying plunger or member to which splicing tape is held by suction until it is deposited on the abutting ends of two tapes to be spliced, e.g., a splicer of the kind disclosed in U.S. Pat. Nos. 3,753,835, 4,364,791, 4,385,959, 4,430,145, 4,462,858, 4,475,970, 4,478,674, 4,486,262 and 4,599,130.

Figure 16:
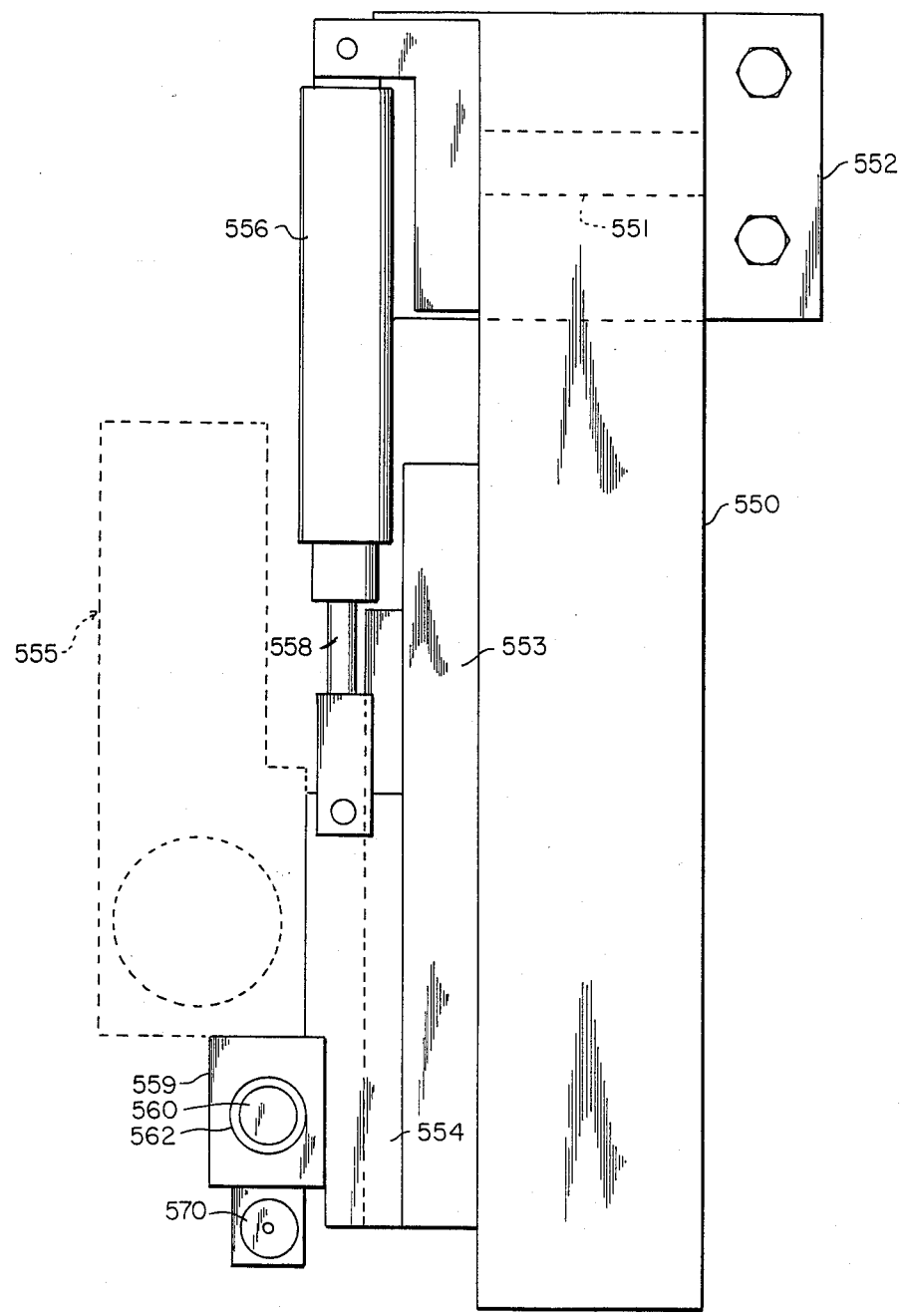
FIG. 16 is an enlargement of a portion of FIG. 2 showing the splicer mount assembly.
Figure 17:
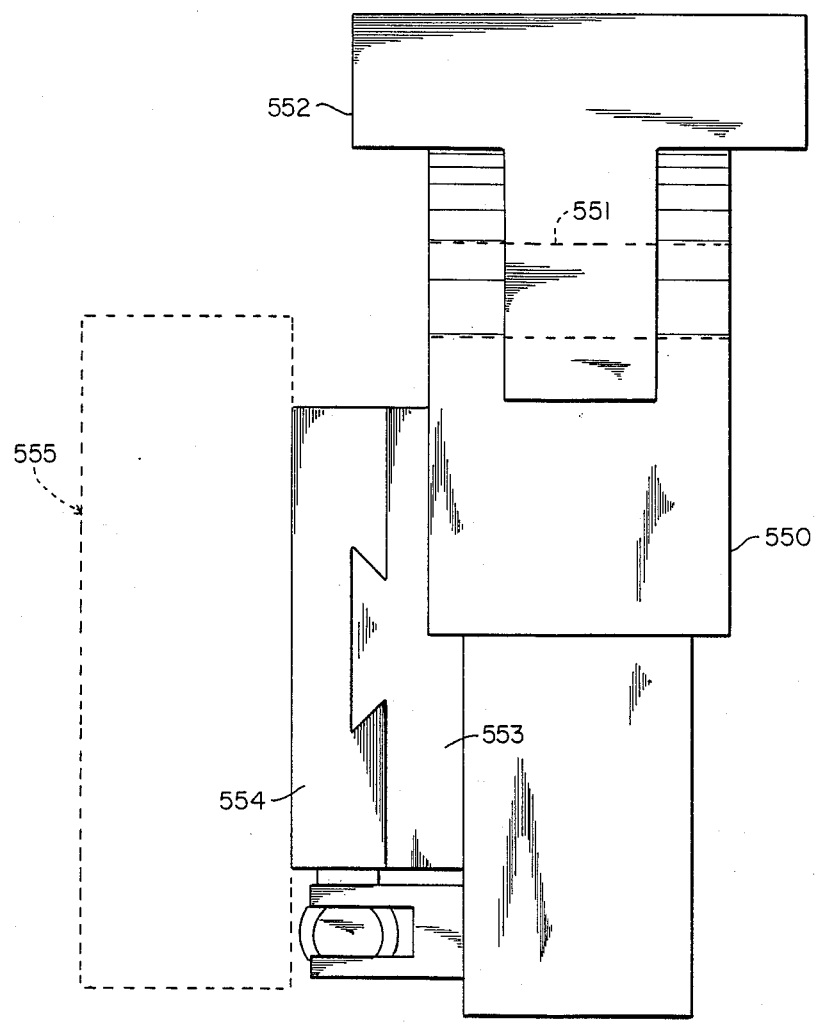
FIG. 17 is a plan view of the splicer mount assembly.
Figure 18:
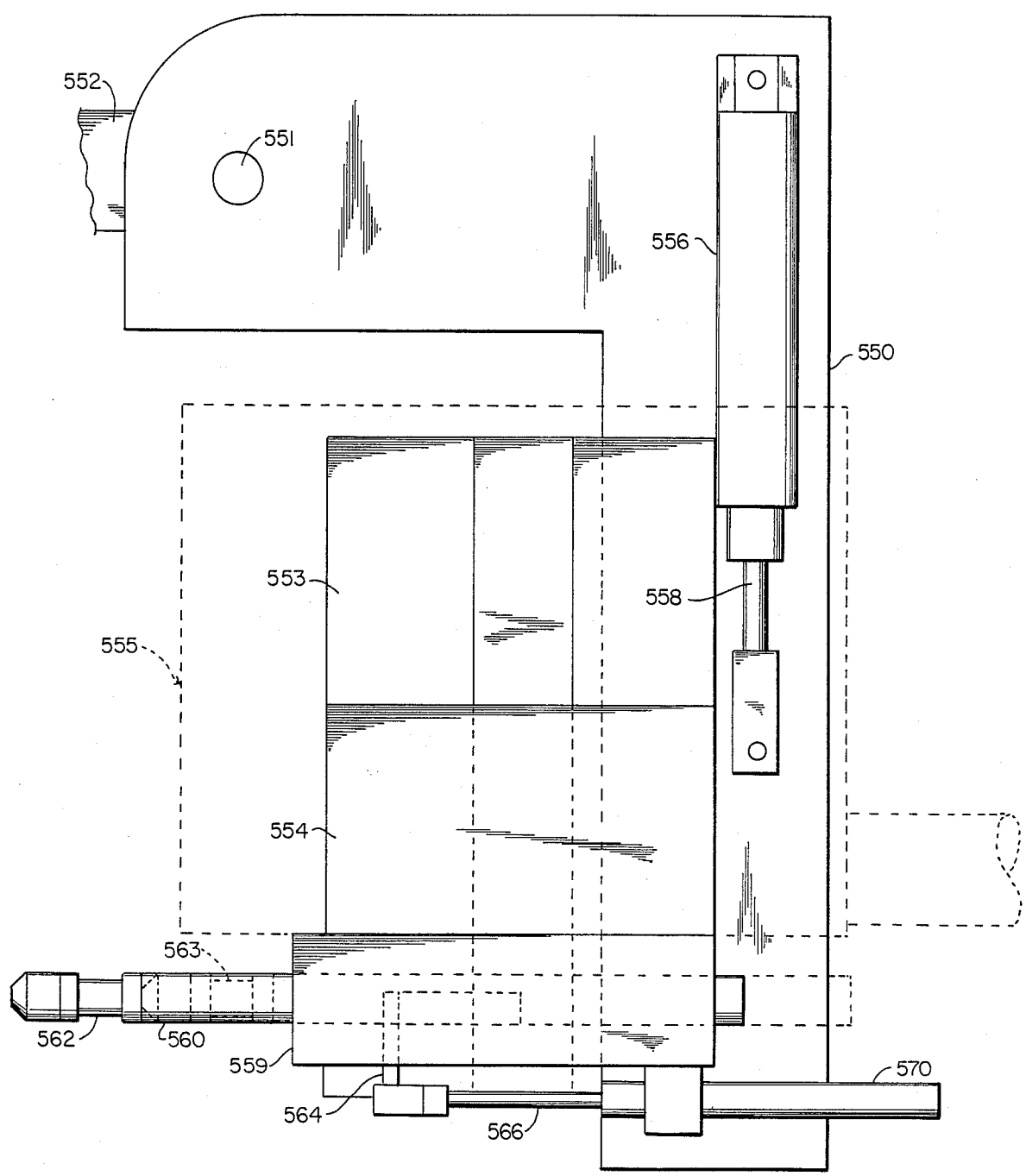
FIG. 18 is a side elevation of the splicer mount assembly.

The splicer support plate 550 normally is positioned as shown in FIGS. 16 and 18, whereby splicer 555 is oriented at a right angle to the front panel 4 so as to be able to apply splicing tape to leaders and use tape supported on the shift blocks. The pivot connection 551 (FIG. 17) allows support plate 550 to be pivoted so as to swing splicer 555 outwardly and upwardly away from the shift block assembly, as may be required to facilitate inspection of the tapes supported on the shift blocks.

AUXILIARY TAPE GUIDE ROLL

Affixed to the bottom end of slide block 554 is a block 559 within which is slidably and rotatably disposed a shaft 560 having at its forward end a rotatable grooved tape guide roll 562. Shaft 560 is connected by an arm 564 to the piston rod 566 of a pneumatic actuator 570 that is affixed to the bottom side of block 559. When piston rod 566 is extended, guide roller 562 will extend between the leader tape attached to lower shift block 64 and a C-Zero cassette located in loading position. Normally, actuator 570 is conditioned so that piston rod 566 is retracted, whereby guide roller 562 is spaced forwardly (to the right as shown by dotted lines 563 in FIG. 18) of insert panel 6 and traverse plate 15.

CASSETTE COLLECTION ASSEMBLY

The cassette collection assembly 16 (FIGS. 2 and 3) is attached to front panel 4 between insert panel 6 and includes an inclined chute 580 (FIG. 3) whose upper end terminates at a point directly below clamp lever 472. Chute 580 functions to intercept and collect loaded cassettes which fall down from the loading station after clamp lever 472 is moved to release position.

SUPPLY REEL DRIVE ASSEMBLY AND TAPE COUNTER

Referring now to FIG. 2, the supply reel shaft assembly 26 is driven by a supply reel servomotor 588 mounted behind front panel 4. Use tape 25 paid off of supply reel 24 passes over a guide roll 590, a tape counter roll 591, and a guide roll 593 (all rotatably attached to front panel 4) to a slack takeup roll 595 that is mounted for reciprocal movement along an arcuate slot 596 in front panel 4. The use tape passes from slack takeup roll 595 over a pair of guide rolls 597 and 598 (also mounted to front panel 4) down onto the middle shift block 62. Although not shown, it is to be understood that tape counter roll 591 is coupled to a tachometer or other type of revolution counter, e.g., as disclosed in U.S. Pat. Nos. 3,997,123 and 4,436,251, so that as tape 25 is transported, electrical signals are generated that indicate the length of tape being wound into the C-Zero cassette. The slack takeup roll 595 preferably forms part of a tape winding system such as is disclosed in U.S. Pat. No. 4,436,251, which also discloses how movement of a slack takeup roll is used to control tape tension and tape winding speed. Of course, it is understood that slack takeup roll 595 may be replaced by a vacuum column tape tension control arrangement, e.g., an arrangement such as the one shown in U.S. Pat. Nos. 4,372,503 and 4,377,251 of David Kincheloe et al.

LEADER EXTRACTOR

Figure 13:
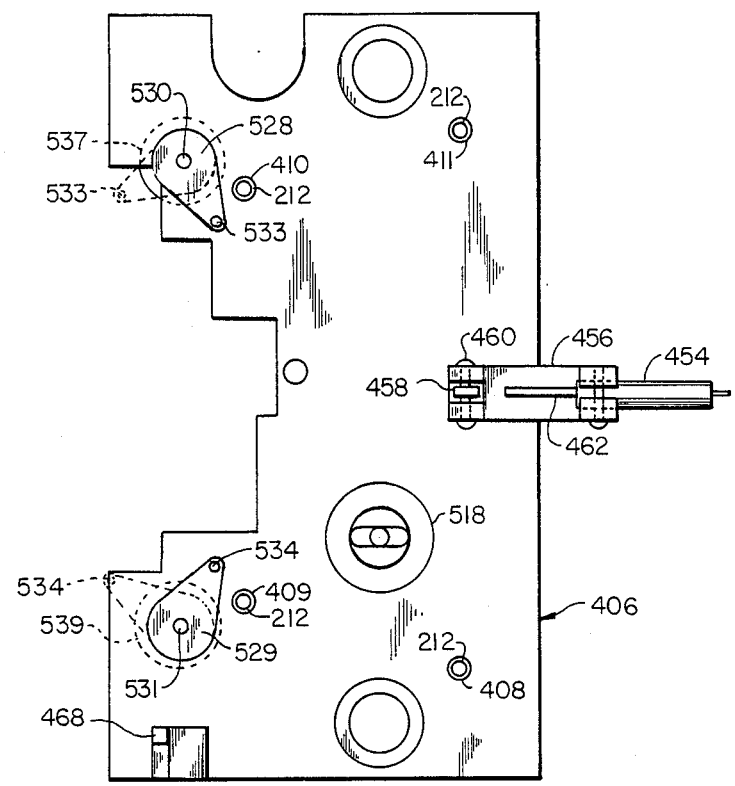
FIG. 13 is an enlarged front view of a portion of the takeup spindle assembly.

Referring now to FIG. 13, extraction of the leader tape from a cassette to be loaded is accomplished by a pair of tear drop-shaped arms 528 and 529 that are secured to the output shafts 530 and 531 of two small electric motors 537 and 539 respectively. The motors are affixed to the rear side of shift plate 406 and shafts 530 and 531 are rotatably mounted in shift plate 406. Arms 528 and 529 have leader extractor pins 533 and 534 attached thereto and projecting forwardly therefrom. Motors 537 and 539 control rotational movement of arms 528 and 529. Arms 528 and 529 are in the position shown in FIG. 13 at the beginning of a loading operation, i.e., when a new C-0cassette is disposed in holder 340 and the latter is disposed in its cassette-receiving position (FIG. 3). When motors 537 and 539 are energized, arms 528 and 529 rotate clockwise and counter-clockwise respectively through like angles of between about 45 and about 115 degrees (see, for example, the positions shown in phantom in FIG. 13), causing pins 533 and 534 to engage and pull out the leader of the new cassette and extend it over upper and lower splicing blocks 60 and 64. Preferably, the extent of rotational movement of arms 528 and 529 is determined by the length of the leader in the cassette, with current sensing means being coupled to motors 527 and 539 to (a) sense the increase in current that occurs when further rotation of the arms is stopped by the resistance that results from the fact that the leader has been fully pulled out of the cassette, and (b) stop the motors when the currents exceed a predetermined amplitude level. Alternatively mechanical stop means may be provided to limit rotation of arms 528 and 529. In this connection it is to be appreciated that the motors 537 and 539 may be provided with internal or external mechanical stop means to limit rotation of arms 528 and 529.

MACHINE CONTROL SYSTEM

Figure 19:
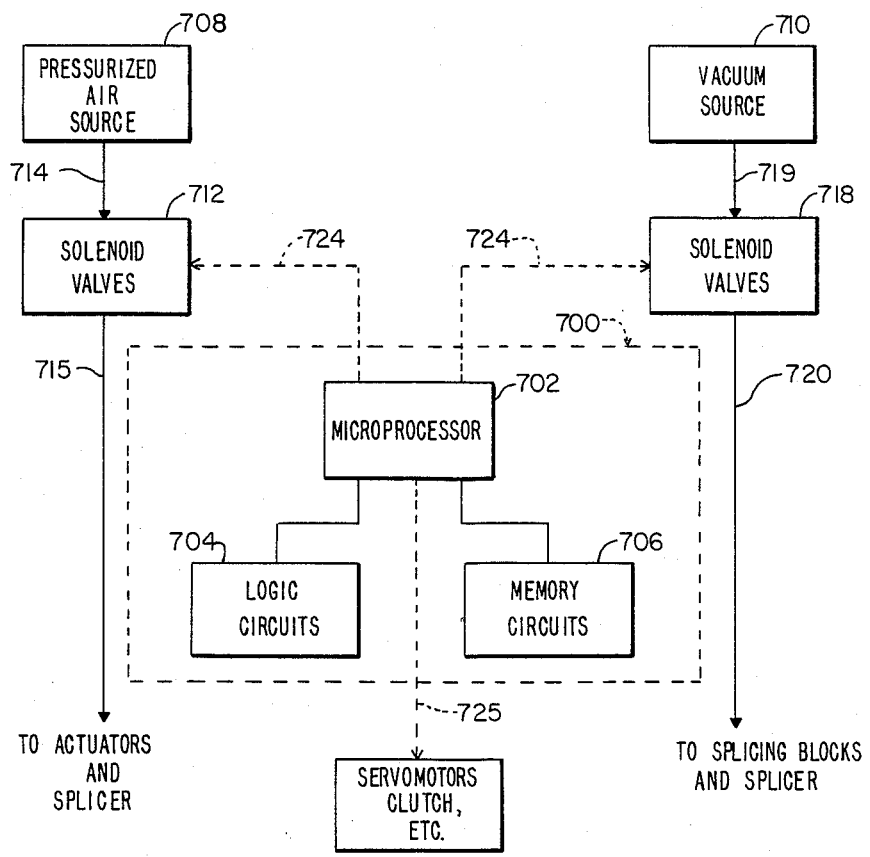
FIG. 19 is a schematic diagram of the control system of the same loading machine.

FIG. 19 schematically illustrates the control system for the machine. The control system comprises a programmable controller 700 which preferably comprises a microprocessor 702 and associated logic and memory circuits 704 and 706. Additionally, the control system comprises a source of pressurized air 708, a vacuum source 710, a first plurality of solenoid valves 712 connected by hose lines 714 and 715 so as to control the flow of pressurized air from source 708 to the various actuators hereinabove described, and also splicer 555, a second plurality of solenoid valves 718 connected by hose lines 719 and 720 so as to control the application of suction by vacuum source 710 to the hose fittings (hereinabove described) of shift blocks 60, 62 and 64, and also, as required, to splicer 555, a plurality of electrical circuit lines 724 for transmitting electrical signals from the programmable controller to the individual solenoid valves, and a plurality of electrical circuit lines 725 for transmitting signals between the programmable controller and the other electrical components of the machine, such as brake 262, servomotors 494 and 588, clutch 514, the tachometer (not shown) associated with tape counter roll 591, and other electrical components of the tape winding system (not shown) associated with slack takeup roll 595.

The microprocessor 702 of programmable controller 700 is programmed so as to cause the machine to operate in the manner hereinafter described. Details of the microprocessor computer program are not provided since (1) programming of a microprocessor is a well-known art, (2) the specific form of the program will vary according to the kind or model of microprocessor used in the programmable controller and the programming language used in preparing the computer program, (3) the nature and form of the program will be obvious to a person skilled in the art from the following detailed description of the operation of the machine, and (4) the timing aspects of the program will vary according to the response characteristics of the various pneumatic and electrical devices employed in the machine. Also, while takeup motor 494 and supply reel motor 588 preferably are operated in accordance with the invention disclosed in U.S. Pat. No. 4,436,251, it is to be understood that operation of those motors may be controlled by some other motor control system.

MODE OF OPERATION

The mode of operation of the above-described machine will now be described with reference to FIGS. 19, 20A-D, 21A-G and 22A-G.

Assume that the machine is in its reset or start position (FIGS. 20A, 21A and 22A), with the power switch 21 in "On" position, the control system coupled to the air and vacuum sources 708 and 710, and a cassette disposed in holder 340 with the latter located in the position shown in FIG. 2. In this "reset" or "start" position, the upper shift block assembly 60, 68 is in its down position, the lower shift block 64 is in its up position, and center shaft 36 is in its down position as a result of retraction of piston rod 52 of actuator 54. At the same time, both actuators 230 and 240 have their operating rods retracted with actuator 230 extending parallel to cantilever support plate 216 at a right angle to the front panel 4. Consequently, upper shift block assembly 60, 68 and lower shift block 64 are both disposed so that their recessed surfaces 126 and 184 are facing the cassette to be loaded. At the same time center shift block 62 is oriented so that its recessed surface 132 is facing forward, in the manner shown in FIG. 3. Simultaneously, vacuum is being applied to tape guide 10 and the middle shift block 62 so as to hold in place the leading end of a use or supply tape 25 extending down from guide roll 598. In this reset or start position, shift plate 406 and the associated takeup spindle assembly are in their first or rear limit position (the "reset" position) as a result of retraction of the piston rod of actuator 420. The traverse carriage plate 15 is also in its first limit or "reset" position (FIGS. 2 and 3), as a result of retraction of piston rod 388 of actuator 386. The slide plate 554 supporting splicer 555 is in its lower limit position (the piston rod of actuator 556 is extended).

Operation of the machine is initiated by depressing a start button in the switch bank 22 on the front panel of the machine. Immediately, the piston rod of cassette holder actuator 366 (FIG. 10) is retracted so as to position holder 340 in front of the takeup spindle assembly associated with traverse plate 15, and simultaneously the door unlock pin 450 is extended by operation of actuator 446 to unlock the cassette door.

Immediately thereafter clamp lever actuator 490 (FIG. 12) operated so as to extend its piston rod 492 and thereby cause clamp lever 472 to clamp the cassette against traverse plate 15, and simultaneously shift plate 406 and the associated takeup spindle assembly are extended to their intermediate position (i.e., the "wind" position) by operation of actuators 420 and 434.

Referring now to FIGS. 11-13, as shift plate 406 moves into its intermediate "wind" position, locator pins 408-411 enter the locator holes 611-614 in the cassette and force the cassette against the lip 473 of clamp mount 470, and simultaneously (1) door opening bar 468 engages and pushes the cassette door 606 to open position, (2) adaptor 518 of takeup spindle 517 enters and drivingly engages the hub 602 of cassette 600, (3) the hub-unlocking actuator 454 is operated to unlock the hubs of the cassette, and the leader extractor pins penetrate the cassette behind its tape leader. Then motors 537 and 539 are energized so as to cause arms 528 and 529 to rotate clockwise and counterclockwise respectively so that pins 533 and 534 will force the leader agains blocks 60 and 64. Thereafter, holder 340 and the door unlock pin 450 are retracted to their at-rest positions.

Immediately thereafter traverse plate 15 is shifted from its retracted limit position to its extended limit position (i.e., the cut position) by retraction of piston rod 388 of actuator 386 (FIGS. 10 and 11), so as to place the cassette leader tape against shift blocks 60 and 64.

Thereafter, vacuum is applied to the upper and lower shift blocks 60 and 64 to attach the leader tape to those shift blocks. Next, by operation of actuator 522, cutter assembly 524 is extended to move cutter blade 525 along cut line 527 (FIGS. 21A, 21B) to cut the leader tape into two leaders 27A and 27B (FIGS. 21A, 21B), one held to shift block 60 and the other held to shift block 64, and then the cutter is retracted. Then, by application of pressurized air through hose fitting 96 (FIG. 4), the upper shift block subassembly 60, 68 is moved up on shaft 36 and, by application of pressurized air via hose fitting 178 (FIG. 5), lower shift block 64 is moved down, thereby separating the two leaders 27A and 27B and causing those leaders to form loops extending from the cassette to shift blocks 60 and 64 (see FIGS. 21A, 21B). These loops facilitate the subsequent splicing operations.

Next, shift plate 406 is moved to its forward limit position (the tape splice position) determined by retraction of the piston rod of actuator 434 (FIG. 20B). Forward movement of plate 406 occurs at this time since air pressure is still applied to actuator 420. This causes rod 248 to rotate the upper rear gear 208 clockwise (as seen in plan view). It is to be noted that at this time brake 262 is energized to lock the bottom gear 210 against rotation, and no air is being supplied to the upper actuator 230, with the result that its piston rod 228 will become extended as the upper gear rotates. Also at this time no air is supplied to actuator 240, so that its piston rod is extended when the upper gear 208 rotates clockwise. This rotation of upper gear 208 causes the lower shift block 64 (and also upper shift block support member 68) to rotate clockwise 90 degrees so that its recessed surface 184 is now facing forward away from insert panel 6, and shift block 60 is pivoted on pivot 112 to the position shown in FIG. 20B by roller 146 when shift block 64 is rotated clockwise. The forward movement of shift plate 406 also causes (a) bar 439 to push pivot mount 470 forward away from traverse plate 15 and (b) locator pins 408-411 to move the cassette forward away from traverse plate 15. The cassette remains engaged with lip 473 of pivot mount 470 when shift plate 406 is moved to its forward limit position. This movement of shift plate 406 to its forward limit or "splice" position is conducted to facilitate holding the two leaders on shift blocks 60 and 64 in position to be spliced.

Next the lower splicing block 64 is moved up along shaft 36 into engagement with middle shift block 62. Then splicer 555 is operated to splice the leader on shift block 64 to the leading end of the use tape 25 on shift block 62 (FIGS. 21C, 22C).

Figures 20C, 20D:
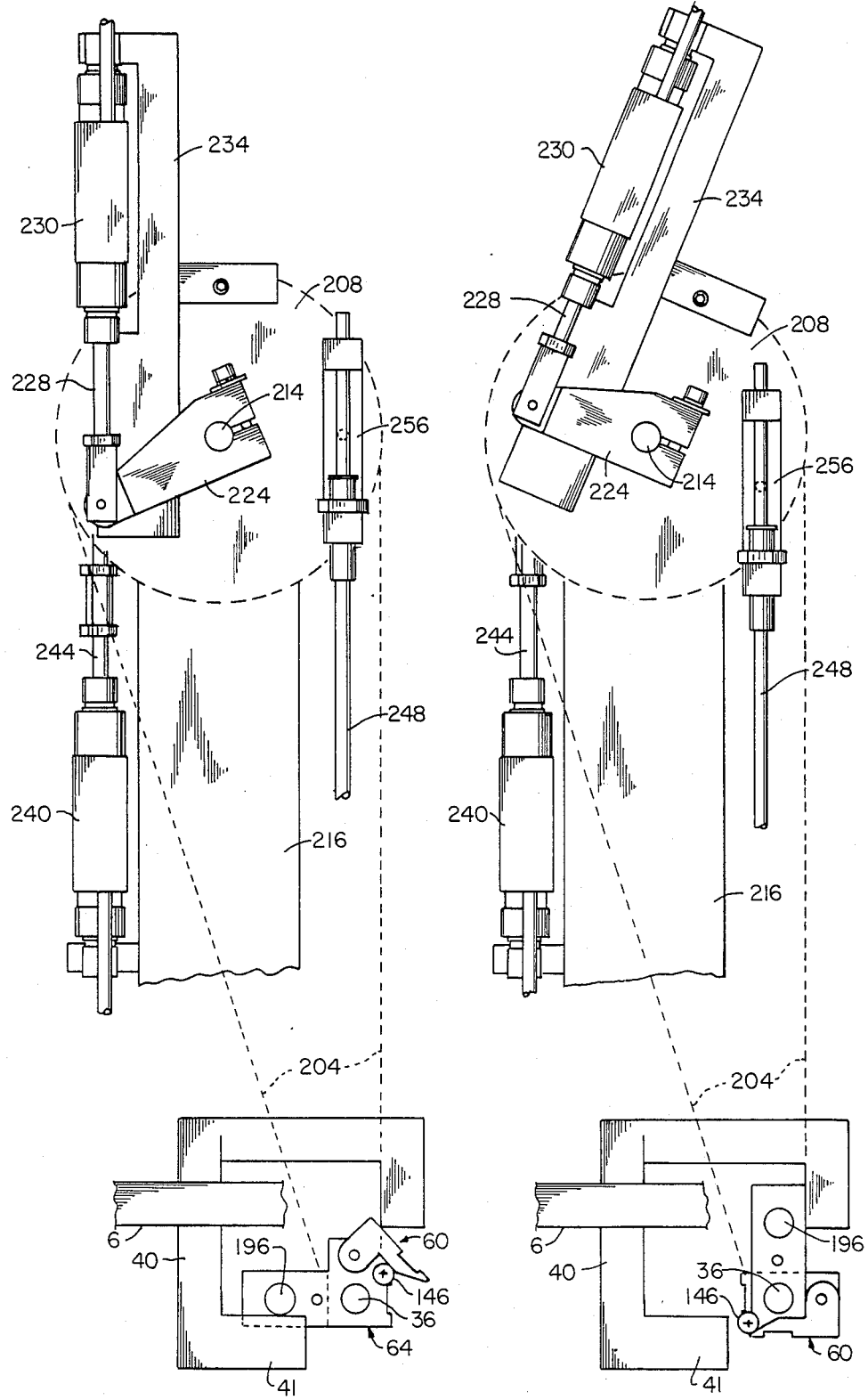
Figure 21B:
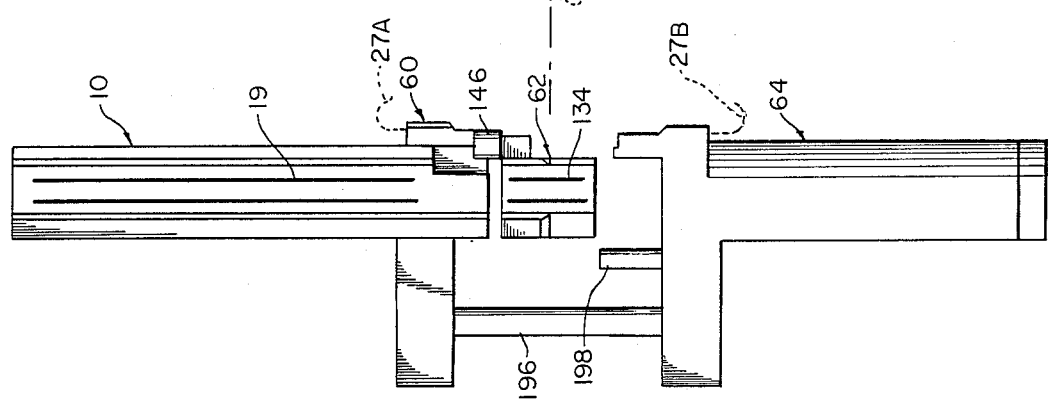

Thereafter, shift upper block assembly 60, 68 and shift blocks 62 and 64 are all rotated 90 degrees counterclockwise (as viewed in FIG. 20C). This phase of the operation involves two actions occurring virtually simultaneously. The first identified action comprises movement of shift plate 406 back to its intermediate "wind" position. The second action comprises applying air to actuator 240 so as to retract piston rod 244 and thereby cause upper rear gear 208 to rotate counterclockwise back to its original position. This rotation of gear 208 acts through belt 204 to rotate lower shift block 64 counterclockwise. It is to be noted that since the lower and middle splicing blocks 64 and 62 are locked together via pin 198, when shift plate 406 is moved back to its intermediate "wind" position, gears 200 and 202 will act through belts 204 and 206 to cause gears 208 and 210 to rotate together. The piston rod of upper actuator 230 remains extended at the same time that the push rod of actuator 240 is retracted during this 2-fold action.

The counterclockwise rotation of blocks 62 and 64 occurs with roller 146 holding shift block 60 away from support member 68 so as to keep the upper leader out of the way of the portion of use tape 25 that extends down onto block 62.

It is to be noted that movement of shift plate 406 and the associated takeup spindle assembly to the wind position is determined by engagement of the head 442 of actuator 434 with motor plate 404.

Immediately following the 2-fold action described above, traverse plate 15 is retracted to its intermediate position (i.e., the wind position) determined by engagement of piston rod 396 of actuator 592 with bracket 394, after which the vacuum to the middle and lower shift blocks 62 and 64 is removed. At this time, the lower leader guide roll 562 below splicer 555 is extended so as to be positioned between the lower leader on the lower shift block and the cassette. Once the guide roller is in place, wind spindle clutch 514 is engaged and servomotors 494 and 588 are energized so as to cause tape to be wound onto the lower hub of the cassette. The microprocessor deenergizes clutch 514 and shuts off the two servomotors when a predetermined amount of tape has been wound into the cassette.

On termination of winding, shaft 36 is moved up by operation of actuator 54. This shifts all three shift blocks upward to the cut position. This is followed by reapplication of vacuum to the middle and lower shift blocks 62 and 64 to draw the use tape against those blocks. Then leader guide roller 562 is retracted and the traverse plate 15 is moved to its forward limit position (the "cut" position). Next the cutter is operated (FIGS. 21E, 22E) to cut the use tape between leader blocks 62 and 64.

Then, traverse plate 15 is retracted to its intermediate position (the "wind" position). Thereafter, the lower shift block 64 is moved down and shaft 36 is rotated 90 degrees so that the recessed tape support surface of shift block 62 faces forward. This rotation of shaft 36 and shift block 62 is accomplished by retracting the piston rod of actuator 230 (note the actuator 230 is oriented at a right angle to front panel 4 at this time). Next, the upper and lower shift blocks 60 and 64 are moved toward one another (FIG. 21F, 22F). At this point the upper and lower shift blocks 60 and 64 are facing the cassette and shift block 62 is facing forward away from panel 6.

Next, shift plate 406 and the associated takeup spindle assembly are extended to their forward limit position (the "splice" position), as shown in FIGS. 21G and 22G. Splicer slide plate 554 is then moved to its upper limit position and splicer 555 is operated so that splicing tape is applied to splice together the trailing end of the tape on lower shift block 64 and the leader on shift block 60.

Subsequently, the vacuum to the upper and lower shift blocks is removed. Shift plate 406 and the associated takeup spindle assembly are then retracted to their intermediate position (the "wind" position), and air is applied to spring actuator 240 so as to cause it to rotate gears 208 and 210 clockwise, thereby returning actuator 230 to its original right angle position (FIG. 14). At this point the upper and lower splicing blocks 60 and 64 are facing the cassette and splicing block 62 is facing forward. Thereafter, clutch 514 and servomotor 490 are activated for a brief period of time sufficient to wind into the cassette the trailing end of the use tape and the upper leader.

Then, traverse plate 15 is retracted to its first limit position (the "reset" position). Thereafter, shift plate 406 and the associated takeup spindle assembly are retracted to their first or rear limit position (the "reset" position) to withdraw locator pins 408–411 from the cassette and allow the cassette door to close, and actuator 490 is deactivated so as to cause clamp lever 472 to release the loaded cassette. The released cassette drops down from the machine to the cassette collection platform 16. Almost simultaneously shaft 36 is allowed to drop back to its lower limit position to restore the splicing blocks to their original vertical level.

Thereafter, other cassettes may be loaded by causing the machine to repeat the steps hereinabove described.

It is to be appreciated that brake 262 is operated only once to prevent rotation of shaft 214 when the upper and lower shift blocks are rotated to move them into alignment with the center block, i.e., when going to the first splice position.

Also the upper splicing block 60 is pivoted by the middle splicing block 62 so as to be out of the way of use tape 25 when the splicing blocks are moved to effect the first splice It stays in that position during the winding operation, and returns to its original position only when the middle splicing block 62 is rotated (relative to splicing blocks 60 and 64) back to its forward-facing position as shown in FIG. 21A (the upper and lower splicing blocks 60 and 64 are facing the cassette during this movement of splicing block 62)

Following are definitions of terms used herein or in the following claims to describe the various positions of splicing blocks 60, 62 and 64:

(a) the term "first and second limit positions" means the two limit positions reached by the first and second shift blocks when rotated on shaft 36 clockwise and counterclockwise respectively, as viewed in FIG. 6 and 20A–D;

(b) the term "first and second rotational positions" means the two limit positions reached by the third shift block (relative to the first and second shift blocks) when the third shift block is rotated counterclockwise and clockwise respectively;

(c) the term "first and second block positions" means the two limit positions reached by the first and second shift blocks when they are moved axially along said shaft, with the second block positions for shift blocks 60 and 64 being reached when the latter are moved away from one another (FIG. 21B); and (d) the term "first and second shaft limit positions" means the two limit positions reached by the third shift block 62 and shaft 36 when the shaft is moved axially, with the first shaft limit position being reached when the actuator rod 52 of actuator 50 is retracted.

MODIFICATIONS

Obviously, the apparatus shown in FIGS. 1-22 may be modified without departing from the principles of the invention. Thus, for example, means other than pneumatic actuators may be employed to operate the several mechanisms hereinabove described. Various forms of splicers may be used. Also the sequence of steps hereinabove described may be varied without departing from the principles of the invention. Another modification that has been considered is to replace actuator 54 with some other mechanism. Similarly, means other than gears 200, 202, 208 and 210, belts 204 and 206, actuators 230 and 240, rod 248, and actuators 420 and 434 may be used to control movement of the shift blocks 60-64. Also another means may be used in place of clamp members 470 and 472 to clamp the cassette. A different form of takeup spindle drive assembly also may be used.

Still other changes will be obvious to persons skilled in the art.

What is claimed is:

1. An improved shift block assembly for use in splicing tape to leaders comprising:
    means defining an axis of rotation;
    a shift block support means mounted for rotational and axial movement on said axis;
    a first shift block carried by said shift block support means;
    a second shift block mounted for rotational and axial movement on said axis;
    a third shift block mounted for rotational movement on said axis;
    first fluid-powered shift means for shifting said shift block support means on said axis between a first position adjacent said third block and a second position spaced axially from said third block, said first fluid-powered shift means comprising portions of said shift block support means;
    second fluid-powered shift means for shifting said second shift block on said axis between a first shift block position adjacent said third block and a second position spaced axially from said third block, said second fluid-powered shift means comprising portions of said second shift block; and
    first, second and third selectively operable tape holding means for holding a tape in position on each of said first, second and third shift blocks respectively.

2. A shift block assembly according to claim 1 wherein said first, second, and third tape holding means comprise:
    first, second and third tape guide means respectively,
    first, second and third groups of suction holes in said first, second and third shift blocks associated with said first, second and third tape guide means respectively, and
    means for connecting said groups of suction holes in said first, second and third blocks to a vacuum source.

3. A shift block assembly according to claim 2 further including:
    first selectively operable means for rotating said shift block support means on said axis between first and second rotational limit positions;
    second selectively operable means for rotating said second block on said axis between first and second limit positions corresponding to the first and second limit positions of said shift block support means; and
    third selectively operable means for rotating said third block on said axis between a first relative position in which said third block has a first predetermined angular relationship with said second shift block and a second relative position in which said third block has a second predetermined angular relationship with said second shift block.

4. A shift block assembly according to claim 3 further including means for limiting axial movement of said shift block support means away from said third block.

5. A shift block assembly according to claim 4 further including means for limiting axial movement of said second shift block away from said third block.

6. A shift block assembly according to claim 5 wherein said third shift block is capable of axial motion, and further including means for limiting axial movement of said third shift block.

7. A shift block assembly according to claim 6 further including means for rotating said first shift block on a second axis eccentric to said first axis so as to locate a tape held by said first shift block out of the path of a tape on said third shift block.

8. A shift block assembly according to clam 7 wherein said means for rotating said first shift block on said second axis comprises means carried by said third shift block.

9. A shift block assembly according to claim 3 wherein said axis is determined by a shaft on which said shift block support means and said second and third blocks are mounted.

10. A shift block assembly according to claim 9 wherein said third shift block is affixed to said shaft and said shift block support means and said second shift block are slidably mounted on said shaft for axial movement toward and away from said third shift block.

11. A shift block assembly according to claim 10 wherein said first fluid-powered shift means comprises means on said shift block support means defining an annular space surrounding said shaft, means subdividing said annular space into first and second variable size chambers so that the size of said first chamber varies inversely with the size of said second chamber as said shift block support means moves axially along said shaft toward and away from said third shift block, and first and second fluid-transmitting means for transmitting pressurized fluid into and out of said first and second chambers respectively, whereby said shift block support means will be caused to (a) move along said shaft toward said third shift block when the fluid pressure in said first chamber exceeds the fluid pressure in said second chamber, and (b) move along said shaft away from said third shift block when the fluid pressure in said second chamber exceeds the fluid pressure in said first chamber.

12. A shift block assembly according to claim 10 wherein said second fluid-powered shift means comprises means on said second shift block defining an annular space surrounding said shaft, means subdividing said annular space into first and second variable size chambers so that the size of said first chamber varies inversely with the size of said second chamber as said second shift block moves axially along said shaft toward and away from said third shift block, and first and second fluid-transmitting means for transmitting pressurized fluid into and out of said first and second chambers respectively, whereby said second shift block will be caused to (a) move along said shaft toward said third shift block when the fluid pressure in said second chamber exceeds the fluid pressure in said first chamber, and (b) move along said shaft away from said third shift block when the fluid pressure in said first chamber exceeds the fluid pressure in said second chamber.

13. A shift block assembly according to claim 1 wherein said blocks are arranged so that in one state of operation said third shift block lies adjacent to said first and second blocks but its tape holding means is displaced 90 degrees from the tape holding means of said first and second shift blocks, in a second state of operation said third shift block lies adjacent said second shift block and its tape holding means is aligned with the tape holding means of said second shift block, in a third state of operation said third shift block lies adjacent said first shift block and its tape holding means is aligned with the tape holding means of said second shift block, and in a fourth state of operation said third shift block is spaced axially from said second shift block.

14. A shift block assembly according to claim 1 further including means for locking said shift block support means and said second shift block together so that they will rotate together but can move axially relative to one another.

15. A shift block assembly according to claim 14 wherein each of said first and second shift blocks is rotatable on said axis through an angle of about 90 degrees.

16. A shift block assembly according to claim 15 wherein said third block is rotatable on said axis through an angle of about 180 degrees.

17. A shift block assembly according to claim 1 further including means for operating said foregoing means so that selectively (a) said first and second shift blocks are positioned to abut said third shift block or (b) said first and second shift blocks are spaced from said third shift block.

18. A shift block assembly according to claim 14 in combination with splicer means for splicing (1) a leader tape and a use tape supported by said second and third shift blocks respectively when said shift blocks are aligned in a first splicing position, and (2) a leader tape and a use tape supported by said first and second shift blocks respectively when said first and second shift blocks are aligned in a second splicing position.

19. A shift block assembly according to claim 1 comprising:
a support plate;
a first shaft defining said axis of rotation;
means connected to said support plate supporting said shaft for rotational and axial movement on said axis;
a first driven pulley attached to said first shaft so as to rotate therewith;
a second driven pulley rotatably mounted on said first shaft and affixed to said second shift block;
a second shaft spaced from said support plate;
means rotatably supporting said second shaft;
a first drive pulley attached to said second shaft to so as to rotate therewith;
a second drive pulley rotatably mounted on said second shaft;
a first belt extending around and between said first driven pulley and said first drive pulley;
a second belt extending around and between said second driven pulley and said second drive pulley;
a shift plate movable toward and away from said support plate;
a linkage between said shift plate and said second drive pulley, said linkage comprising a pivotal connection between said linkage and said shift plate and a pivotal connection between said linkage and said second drive pulley;
a lever affixed to said second shaft; and
an actuator comprising a cylinder and a telescoping operating rod, said cylinder being attached to said second drive pulley and said operating rod being attached to said lever;
whereby (a) said second drive pulley will rotate in a first direction when said shift plate moves toward said support plate and thereby cause said second belt and said second driven pulley to rotate said second shift block in the same direction as said second drive pulley, and (b) said first drive pulley will rotate in a first direction or a second opposite direction relative to said second drive pulley when said actuator operating rod is extended or retracted, thereby causing said first belt and said first driven pulley to rotate said third shift block in the same direction as said first drive pulley.

20. A shift block assembly according to claim 19 further including a lost motion connection between said linkage and said second drive pulley, whereby said second drive pulley is moved by said linkage only if movement of said shift plate exceeds a predetermined distance.

21. A shift block assembly according to claim 1 further comprising:
first rotational drive means for selectively causing said shift block support means and said second shift block to rotate together on said shaft between a first shaft-related position and a second shaft-related position;
second rotational drive means for selectively causing said second shift block to rotate relative to said shift block support means between first and second block-related positions; and
drive means for selectively causing said third shift block to rotate between first and second rotational limit positions.

22. A shift block assembly according to claim 21 wherein said first shift block is pivotally mounted to said shift block support means so as to be movable between a first pivot position and a second pivot position relative to said support member; and further comprising means for selectively causing said first shift block to pivot relative to said support means between said first and second pivot positions.

23. A cassette tape loading machine for loading a use tape into a C-Zero cassette of the type comprising a pair of rotatable hubs and a leader tape extending between said hubs:
means for holding a supply of use tape;
means for holding a C-Zero cassette in a selected loading position so that it may be loaded with a use tape;
a shift block assembly for use in splicing a use tape to first and second leaders formed by cutting said leader tape, said shift block assembly comprising;
a shaft;
means mounting said shaft for rotational and axial movement;
a first shift block assembly comprising a shift block support member and a first shift block pivotally mounted to said support member, said shift block support member being rotatable mounted on said shaft; said first shift block having a first guideway for supporting a first tape and means for holding said first tape in said first guideway by suction; second and third shift blocks;

said second shift block being rotatably and slidably mounted on said shaft, said second shift block having a second guideway for supporting a second tape and means for holding said second tape in said second guideway by suction;

said third shift block being affixed to said shaft so as to move with said shaft when said shaft is rotated on its axis or moved along its axis, said third shift block being disposed between said first and second shift blocks and having a third guideway for supporting a third tape and means for holding said third tape in said third guideway by suction;

means coupling said first shift block assembly and said second shift block together so as to cause them to rotate as a unit while permitting them to move axially relative to one another;

actuator means for selectively rotating said first shift block assembly and said second shift block on said shaft between first and second predetermined angularly spaced limit positions;

actuator means for selectively rotating said shaft and said third shift block between first and second angularly spaced positions relative to said first and second shift blocks;

first and second actuators forming parts of said shift block support member and said second shift block respectively for selectively moving said first shift block assembly and said second block axially on said shaft toward and away from one another;

actuator means for selectively shifting said shaft between first and second axially-spaced limit positions;

control means for operating said foregoing means so as to selectively establish (a) a first condition in which said second and third shift blocks abut one another with their guideways in a first predetermined plane so as to form a first splicing block assembly ready for a first splicing operation, (b) a second condition in which said first and second blocks abut one another with their guideways in said same plane so as to form a second splicing block assembly ready for a second splicing operation, and (c) a third condition in which said third shift block is disposed between but is axially spaced from said first and second shift blocks;

means for positioning a C-0 cassette so that its leader tape will be disposed in said first and second guideways;

selectively operable tape cutter means for cutting a leader tape disposed in said first and second guideways when said first and second shift blocks have their guideways disposed in a second plane, so as to form a first leader extending from said cassette to said first block and a second leader extending from said cassette to said second block;

selectively operable splicer means for splicing the end of a tape held on said second shift block to the adjacent end of a tape disposed on said first or third shift blocks when the tape guideways of said blocks are disposed in said first plane; and selectively operable drive means engageable with one of said hubs for rotating said one hub so that a leader attached to said hub and a use tape attached to said leader will be wound onto said hub on command.

24. A cassette tape loading machine according to claim 23 further including means for operating selected ones of said foregoing means so as to cause said machine to sequentially (a) cut the leader of said C-Zero cassette into first and second leaders supported by said first and second shift blocks respectively, (b) splice said second leader to a use tape supported by said third shift block, (c) wind said first leader and a predetermined amount of said use tape into said C-Zero cassette, (d) cut said use tape so as to form a trailing end for said predetermined amount of use tape that is supported by said second shift block, (d) splice said trailing end to said first leader, and (e) wind said trailing end and said first leader into said C-Zero cassette.

25. A machine for loading tape into C-Zero cassettes comprising:

a shift block assembly in the form of first, second and third shift blocks having first, second and third tape guide means respectively;

first means mounting said shift blocks for rotational movement about a selected common axis;

second means mounting said first shift block for rotational movement about a second axis spaced from but parallel to said common axis;

first selectively operable rotational drive means for rotating said first shift block on said common axis;

means for causing said second shift block to rotate on said common axis with said first shift block;

second selectively operable rotational drive means for rotating said third shift block about said common axis;

first selectively operable axial drive means for shifting said first shift block along said axis between a first axial position adjacent said third shift block and a second axial position spaced from said third shift block, said first axial drive means being disposed along said common axis;

second selectively operable axial drive means for shifting said second shift block along said axis between a first axial position adjacent said third shift block and a second axial position spaced from said third shift block, said second axial drive means being disposed along said common axis; and third axial drive means for shifting said third shift block along said axis between first and second axial limit positions;

selectively operable tape cutter means for cutting tape extending across said second and first shift blocks or across said second and third shift blocks when said shift blocks are facing in a first direction;

a cassette loading station;

means for feeding cassettes to be loaded to said loading station;

means for retaining a cassette to be loaded in said loading station;

takeup means including a rotatable takeup spindle, drive means for rotating said takeup spindle on command, and actuating means for moving said takeup spindle into or out of driving engagement with a hub of a cassette located at said loading station; and a splicer comprising means for cutting and applying a piece of adhesive tape to the abutting ends of two tapes to be spliced supported by said second and third shift blocks or said second and first shift blocks when said shift blocks are facing in a second direction.

26. A machine according to claim 25 wherein said control means is adapted to sequentially (a) sever a leader tape that has been positioned on said first and second shift blocks into first and second leaders supported by said first and second shift blocks respectively; (b) splice said second leader to the leading end of a use tape positioned on said third shift block; (c) wind said second leader and a predetermined length of use tape which is connected thereto into a cassette retained in said loading station; (d) sever said use tape between said second and third shift blocks so as to form a leading end disposed on said third shift block and a trailing end disposed on said second shift block; and (e) splice said trailing end to the first leader on said first shift block.

27. A shift block assembly comprising:
a shaft (36) defining an axis of rotation;
a shift block sub-assembly comprising a support member (68) and a first shift block (60), said support member being rotatably and slidably mounted on said shaft and said first shift block being pivotally mounted to said support member so as to be movable between a first near position and a second far position relative to said support member;
second and third shift blocks (64, 62) mounted on said shaft, with said second shift block (64) being rotatably and slidably mounted on said shaft and said third shift block (62) being affixed to said shaft;
first, second and third tape guide grooves (126, 184, 132) in said first, second and third blocks respectively,
suction holes (128, 186 and 134) in said first, second and third blocks associated with said first, second and third tape guide grooves respectively;
first, second and third suction-applying means for selectively connecting the suction holes in said first, second and third blocks to a vacuum source;
first drive means (200, 208) for selectively causing said first shift block (60) to rotate on said shaft between first and second limit positions;
means (196) for causing said first and second shift blocks (60, 64) to rotate together on said shaft (36) between said first and second limit positions;
second drive means (202, 210) for causing said shaft and said third block (62) to rotate between first and second rotational positions relative to said first and second shift blocks;
first selectively operable pneumatic shift means (70, 92A, 92B) comprising a portion of said shift block sub-assembly surrounding said shaft for selectively causing said first shift block (60) to slide along said shaft between a first block position adjacent said third block (62) and a second block position spaced from third block (62);
second selectively operable pneumatic shift means (150, 172A, 172B) comprising a portion of said second shift block (64) surrounding said shaft for selectively causing said second shift block to slide along said shaft between a first block position adjacent said third block (62) and a second block position spaced from said third block (62);
third selectively operable shift means (52, 54) for selectively causing said third block (62) and said shaft (36) to move axially between a first shaft limit position and a second shaft limit position; and
control means for operating said foregoing means in a predetermined order.

28. A shift block assembly comprising:
(1) a shaft 36;
(2) means supporting said shaft for rotational and axial movement;
(3) first, second and third shift blocks (60, 64, 62);
(4) a shift block support member (68) mounting said first-shift block to said shaft so that said first shift block (60) is capable of relative bidirectional movement lengthwise of said shaft and also rotationally about said shaft;
(5) first fluid pressure-responsive means associated with said support member (68) for selectively causing said first shift block to move in a first direction or a second opposite direction lengthwise of said shaft, said first fluid pressure-responsive means comprising a portion of said shift block support member;
(6) second fluid pressure-responsive means associated with said second shift block (64) for selectively causing said second shift block to move in said first direction or said second opposite direction lengthwise of said shaft, said second fluid pressure-responsive means comprising a portion of said second shift block;
(7) said third shift block (62) being affixed to said shaft (36) so as to move with said shaft when it rotates or moves axially,
(8) said first, second and third shift blocks having first, second and third tape-supporting surfaces (126, 184, 132) respectively and first, second and third suction applying means (128, 186, 134) respectively for applying suction so as to hold a tape against said tape-supporting surfaces;
(9) first shaft drive means (202, 210) for selectively rotating said shaft clockwise or counterclockwise;
(10) first lock means (196, 114) for selectively locking said first and second shift blocks to one another so as to cause them to rotate together relative to the axis of said shaft while permitting them to move lengthwise of said shaft toward and away from one another;
(11) second lock means (198, 141) for selectively locking said third shift block to said second shift block so as to cause them to rotate together while permitting them to move lengthwise of said shaft toward and away from one another;
(12) second shaft drive means (52, 54) for selectively moving said shaft in a first axial direction or a second axial direction; and
(13) control means for operating said foregoing means so as to (a) selectively cause said first drive means to rotate said shaft in a clockwise or counter-clockwise direction, (b) selectively operate said second drive means so as to selectively move said shaft in said first or second axial directions; (c) selectively cause said first and second shift blocks to rotate clockwise or counterclockwise on said shaft; and (d) selectively cause said first and second shift blocks to move toward or away from one another.

29. A shift block assembly according to claim 28 wherein said shift block support member, said second shift block, and said shaft are arranged so that said shift block support member and said second shift block are each subdivided into first and second pressure chambers, and further including first and second fluid transmissions means for selectively subjecting said first and second pressure chambers of said shift block support member to a first or second differential fluid pressure; third and fourth fluid transmission means for selectively subjecting said first and second chambers of said second shift block to a first or second differential fluid pressure.

30. A shift block assembly according to claim 29 wherein said shift block support member and said second shift block comprise first and second axial bores respectively, and further including first means on said shaft and said shift block support member for subdividing said first axial bore into said first and second fluid pressure chambers respectively, second means on said shaft and said second shift block for subdividing said second axial bore into third and fourth fluid pressure chambers respectively, means for selectively applying fluid pressure to or removing fluid pressure from the said first and second fluid pressure chambers; and means for selectively applying fluid pressure to or removing fluid pressure from said third and fourth fluid pressure chambers.

31. An improved shift block assembly for use in splicing tape to leaders comprising:

means defining an axis of rotation;
a first shift block;
first means mounting said first shift block for rotational and axial movement on said axis;
a second shift block mounted for rotational and axial movement on said axis;
a third shift block mounted for rotational movement on said axis;
fluid-responsive means including portions of said first means and said second shift block for shifting said first means and said second shift block between a first shift block limit position adjacent said third block and a second shift block limit position spaced axially from said third block; and
first, second and third selectively operable tape holding means for holding a tape in position on each of said first, second and third shift blocks respectively.

32. A shift block assembly according to claim 31 further including:

first selectively operable means for rotating said first block on said axis between first and second rotational positions;
second selectively operable means for rotating said second block on said axis between first and second rotational positions corresponding to the first and second rotational positions of said first shift block; and
third selectively operable means for rotating said third block on said axis between a first relative position in which said third block has a first predetermined angular relationship with said second shift block and a second relative position in which said third block has a second predetermined angular relationship with said second shift block;

33. A shift block assembly according to claim 32 further including means for limiting axial movement of said first, second, and third shift blocks.

34. A shift block assembly according to claim 32 further including means rotatably associated with said first shift block for rotating said first shift block on a second axis eccentric to said first-mentioned axis so as to locate a tape held by said first shift block out of the path of tape on said third shift block.

35. A shift block assembly according to claim 32 wherein said first-mentioned axis is determined by a shaft on which said first, second and third shift blocks are mounted, and further wherein said first shift block comprises a first part rotatably mounted to said shaft and a second part rotatably mounted to said first part.

36. A shift block assembly according to claim 35 further including means for causing said second part to rotate relative to said first part when said second tape holding means is moved into alignment with said third tape holding means.

37. A shift block assembly according to claim 35 wherein said first and second shift blocks are arranged so that in one state of operation said second part of said first shaft block overlaps said third shift block with said first tape holding means being disposed in a plane that intersects the plane of said third tape holding means.

38. A shift block assembly according to claim 32 wherein said blocks are mounted for rotation on a common shaft, and further wherein said blocks are arranged so that in one state of operation the tape holding means of said third shift block is displaced 90 degrees from the tape holding means of said first and second shift blocks and the tape holding means of said first and second shift blocks are aligned with one another, in a second state of operation said second shift block lies adjacent said third block and its tape holding means is aligned with the tape holding means of said third block, and in a third state of operation said first and second shift blocks are spaced axially from said third block.

39. A shift block assembly according to claim 32 wherein each of said first and second shift blocks is rotatable on said axis through an angle of about 90 degrees.

40. A shift block assembly according to claim 32 wherein said third block is rotatable on said axis through an angle of about 180 degrees.

41. A cassette tape loading machine for loading a use tape into a C-Zero cassette of the type comprising a pair of rotatable hubs and a leader tape extending between said hubs:

means for holding a supply of use tape;
means for holding a C-Zero cassette in a selected loading position so that it may be loaded with a use tape;
a shift block assembly for use in splicing a use tape to first and second leaders formed by cutting said leader tape, said shift block assembly comprising;
a shaft;
means mounting said shaft for rotational and axial movement;
first, second and third shift blocks;
said first shift block being rotatably and slidably mounted on said shaft, said first shift block having a first guideway for supporting a first tape and means for holding said first tape in said first guideway by suction;
said second shift block being rotatably and slidably mounted on said shaft, said second shift block having a second guideway for supporting a second tape and means for holding said second tape in said second guideway by suction;
said third shift block being affixed to said shaft so as to move with said shaft when said shaft is rotated on its axis or moved along its axis, said third shift block being disposed between said first and second shift blocks and having a third guideway for supporting a third tape and means for holding said third tape in said third guideway by suction;
means coupling said first and second shift blocks together so as to cause them to rotate as a unit while permitting them to move axially relative to one another;

actuator means for selectively rotating said first and second shift blocks on said shaft between first and second predetermined angularly spaced limit positions;

actuator means for selectively rotating said shaft between first and second angularly spaced positions relative to said first and second shift blocks;

first and second pneumatic actuator means surrounding said shaft for selectively sliding said first and second blocks respectively on said shaft toward and away from said third block;

actuator means for selectively shifting said shaft between first and second axially-spaced limit positions;

means for operating said foregoing means so as to selectively establish (a) a first condition in which said first and second shift blocks abut one another in a predetermined plane so as to form a first tape support assembly, (b) a second condition in which said second and third blocks abut one another in said same plane so as to form a second tape support assembly, and (c) third condition in which said third shift block is disposed between but is axially spaced from said first and second shift blocks;

means for positioning a C-0 cassette so that its leader tape will be disposed in said first and second guideways;

selectively operable cutter means for cutting a leader tape disposed in said first and second guideways along said plane so as to form a first leader extending from said cassette to said first block and a second leader extending from said cassette to said second block;

selectively operable splicer means for splicing the end of a tape held on said second shift block to the adjacent end of a leader disposed on said first or third shift blocks; and selectively operable drive means engageable with one of the hubs of said cassette for rotating said one hub so that a leader attached to said hub and a use tape attached to said leader will be wound onto said hub on command.

42. A cassette tape loading machine according to claim 41, further including means for operating said foregoing means so as to sequentially (a) cut the leader of said C-Zero cassette into first and second leaders supported by said first and second shift blocks respectively, (b) splice said second leader to a use tape supported by said third shift block, (c) wind said second leader and a predetermined amount of said use tape into said C-Zero cassette, (d) cut said use tape so as to form a trailing end for said predetermined amount of use tape that is supported by said second shift block, (d) splice said trailing end to said first leader, and (e) wind said trailing end and said first leader into said C-Zero cassette.

43. A cassette tape loading machine according to claim 42 wherein said shift block assembly further comprises:

a first lower driven pulley attached to said shaft so as to rotate therewith;

a second upper driven pulley rotatably mounted on said first shaft and affixed to said second splicing block;

a second shaft;

means rotatably supporting said second shaft;

a first lower drive pulley attached to said second shaft so as to rotate therewith;

a second upper drive pulley rotatably mounted on said second shaft;

a first belt extending around and between said first lower driven pulley and said first lower drive pulley;

a second belt extending around and between said second upper driven pulley and said second upper drive pulley;

a shift plate mounted for reciprocal movement along a selected axis;

a link extending between said shift plate and said second upper drive pulley;

first connector means connecting said link to said shift plate;

second connector means connecting said link to said second upper drive pulley so that said shift plate can move a predetermined distance along said selected axis before said link exerts a turning force on said second upper drive pulley;

a lever affixed to said second shaft; and an actuator comprising a cylinder and a telescoping operating rod, said cylinder being attached to said upper drive pulley and said operating rod being attached to said lever;

whereby (a) said upper drive pulley will rotate in a first direction when said shift plate moves along said axis a distance greater than said predetermined distance and thereby cause said second belt and said second driven pulley to rotate said second splicing block in the same direction as said upper drive pulley, and (b) said lower drive pulley will rotate in a first direction or a second opposite direction relative to said upper drive pulley or remain stationary when said actuator operating rod is extended or retracted, thereby causing said first belt and said first lower driven pulley to rotate said third splicing block in the same direction as said bottom drive pulley.

44. A splicing block assembly comprising:

a shaft (36) defining an axis of rotation;

a splicing block sub-assembly (58) comprising a support member (68) and a first splicing block (60), said support member being rotatably and slidably mounted on said shaft and said first splicing block being pivotally mounted to said support member so as to be movable between a first near position and a second far position relative to said support member;

second and third shift blocks (64, 62) mounted on said shaft, with said second splicing block (64) being rotatably and slidably mounted on said shaft and said third splicing block (62) being affixed to said shaft;

first, second and third tape guide means (126, 182, 132) associated with said first, second and third blocks respectively, suction holes (128, 186, 134) in said first, second and third blocks associated with said first, second and third tape guide means;

first, second and third suction-applying means for selectively connecting the suction holes in said first, second and third blocks to a vacuum source.

first rotational drive means (200, 208) for selectively causing said first and second shift blocks to rotate on said shaft between first and second limit positions;

second rotational drive means (202, 210) for causing said shaft and said third block to rotate between first and second rotational limit positions;

first shift means (92A, 92B, 88, 90) comprising a portion of said first shift block for selectively causing said first shift block to slide along said shaft between a first block limit position adjacent said third block and a second block limit position spaced from said third block;

second shift means comprising a portion of said second shift block (172A, 172B, 168, 170) for selectively causing said second shift block to slide along said shaft between a first block limit position adjacent said third block and a second block limit position axially spaced from said third block; and third shift means (52, 54) for selectively causing said third block and said shaft to move axially between a first shaft limit position and a second shaft limit position; and control means for operating said foregoing means in a predetermined order.

45. A shift block assembly according to claim 44 further including:

means rotatably associated with said first block for rotating said first block on a second axis eccentric to said first axis so as to locate a tape held by said first block out of the path of tape on said third block.

46. A cassette tape loading machine for loading a use tape into a C-Zero cassette of the type comprising a pair of rotatable hubs and a leader tape extending between said hubs:

means for holding a supply of use tape;

means for holding said C-Zero cassette in a selected loading position so that it may be loaded with a use tape;

a shift block assembly for use in splicing a use tape to first and second leaders formed by cutting said leader tape, said shift block assembly comprising:

a shaft; means mounting said shaft for rotational and axial movement; a first block rotatably and slidably mounted on said shaft; said first block having a first guideway for supporting a first tape and means for holding said first tape in said first guideway by suction; a second block mounted on said shaft, said second block having a second guideway for supporting a second tape and means for holding said second tape in said third guideway by suction; a third block affixed to said shaft so as to move with said shaft when said shaft is rotated on its axis or moved along its axis, said third block being disposed between said first and second blocks and having a third guideway for supporting a third tape and means for holding said third tape in said third guideway by suction; actuator means for selectively rotating said first and third blocks on said shaft between first and second predetermined angularly spaced limit positions; actuator means for selectively rotating said shaft between first and second angularly spaced rotational limit positions; selectively operable pneumatic actuator means concentric with said shaft for selectively sliding said first and second blocks on said shaft toward and away from one another between predetermined first and second block positions; actuator means for selectively shifting said shaft between first and second axially-spaced shaft limit positions; and means for operating said foregoing means so as to selectively establish (a) a first condition in which said second and third blocks abut one another in a predetermined plane so as to form a first shift block assembly, (b) a second condition in which said first and second blocks abut one another in said same plane so as to form a second shift block assembly, and (c) third condition in which said third block is disposed between but is axially spaced from said first and second b;

means for positioning a C-0 cassette so that its leader tape will be disposed in said first and second guideways;

selectively operable means for cutting the said leader tape disposed in said first and second guideways along said plane so as to form a first leader extending from said cassette to said first block and a second leader extending from said cassette to said second block;

selectively operable splicer means for splicing the end of a tape held on said second block to the adjacent end of a use disposed on said third or first blocks; and selectively operable drive means engageable with one of said hubs for rotating said one hub so that a leader attached to said hub and a use tape attached to said leader will be wound onto said hub on command.

47. A cassette tape loading machine according to claim 46 further including means for operating said foregoing means so as to sequentially (a) cut the leader of said C-Zero cassette into first and second leaders supported by said first and second blocks respectively, (b) splice said second leader to a use tape supported by said third block, (c) wind said second leader and a predetermined amount of said use tape into said C-Zero cassette, (d) cut said use tape so as to form a trailing end for said predetermined amount of use tape that is supported by said second shift block, (d) splice said trailing end to said first leader, and (e) wind said trailing end and said first leader into said C-Zero cassette.

* * * * *

UNITED STATES PATENT AND TRADEMARK OFFICE
CERTIFICATE OF CORRECTION

PATENT NO. : 4,858,841
DATED : August 22, 1989
INVENTOR(S) : George M. Woodley et al It is certified that error appears in the above-identified patent and that said Letters Patent is hereby corrected as shown below:

Claim 8, column 22, line 25, "clam" should be -- claim --;

Claim 23, column 25, line 2, "rotatable" should be -- rotatably --;

Claim 28, column 28, line 7, the hyphen between "first-shift" (first occurrence) should be deleted;

Claim 31, column 29, line 56, the semicolon should be a period;

Claim 41, column 31, line 24, the word "a" should be inserted after "(c)";

Claim 44, column 32, line 64, the period should be a semicolon;

Claim 46, column 34, line 21, the word "a" should be inserted after "(c)";

UNITED STATES PATENT AND TRADEMARK OFFICE
CERTIFICATE OF CORRECTION

PATENT NO. : 4,858,841

DATED : August 22, 1989

INVENTOR(S) : George M. Woodley et al

It is certified that error appears in the above-identified patent and that said Letters Patent is hereby corrected as shown below:

Claim 46, column 34, line 23, "b" should be --blocks--.

Signed and Sealed this

Thirty-first Day of July, 1990

Attest:

*Attesting Officer*

HARRY F. MANBECK, JR.

*Commissioner of Patents and Trademarks*